(12) United States Patent
Yao et al.

(10) Patent No.: US 12,596,055 B2
(45) Date of Patent: Apr. 7, 2026

(54) APPARATUS AND METHOD FOR DETECTING MOUNTING STATE OF LIGHT PIPE IN TERMINAL

(71) Applicant: HONOR DEVICE CO., LTD., Shenzhen (CN)

(72) Inventors: Chao Yao, Shenzhen (CN); Chenlong Li, Shenzhen (CN); Qianying Shi, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/915,914

(22) PCT Filed: Apr. 29, 2022

(86) PCT No.: PCT/CN2022/090322
§ 371 (c)(1),
(2) Date: Sep. 29, 2022

(87) PCT Pub. No.: WO2022/267695
PCT Pub. Date: Dec. 29, 2022

(65) Prior Publication Data
US 2024/0219261 A1 Jul. 4, 2024

(30) Foreign Application Priority Data

Jun. 21, 2021 (CN) ......................... 202110687705.5
Jul. 8, 2021 (CN) ......................... 202110774373.4

(51) Int. Cl.
*G01M 11/00* (2006.01)
*G01J 1/42* (2006.01)
*G08B 5/36* (2006.01)

(52) U.S. Cl.
CPC ........... *G01M 11/30* (2013.01); *G01J 1/4204* (2013.01); *G08B 5/36* (2013.01)

(58) Field of Classification Search
CPC .... G01J 1/4204; G01M 11/30; G01M 99/005; G08B 5/36; G01B 11/00; G01V 8/10; H04M 1/24
(Continued)

(56) References Cited

U.S. PATENT DOCUMENTS 5,191,207 A * 3/1993 Leon-Guerrero ...... G01M 11/30
356/73.1
5,394,496 A * 2/1995 Caldwell .............. G02B 6/3806
385/98
(Continued)

FOREIGN PATENT DOCUMENTS

CN 202256715 U 5/2012
CN 102722032 A 10/2012
(Continued)

*Primary Examiner* — Sunghee Y Gray
(74) *Attorney, Agent, or Firm* — Fish & Richardson P.C.

(57) ABSTRACT

An apparatus and a method for detecting a mounting state of a light pipe in a terminal are disclosed. The detection apparatus includes a fixture, a detection light source, and a light detection module. A light inlet path is formed inside the fixture, an opening that is of the light inlet path and that is exposed to the fixture is opposite to a mounting position of the light pipe, and the detection light source is disposed above the fixture. The light detection module is configured to determine the mounting state of the light pipe based on a luminous flux value of detection light. In cases in which the light pipe is properly mounted, the mounting position is deviated, the light pipe is not mounted, or the like, the luminous flux value of the detection light that is transmitted to the light detection module through the light inlet path varies accordingly.

20 Claims, 14 Drawing Sheets

(58) Field of Classification Search

USPC ........................................................ 356/73.1

See application file for complete search history.

(56) References Cited

U.S. PATENT DOCUMENTS

| | | | |
|---|---|---|---|
| 8,094,988 B2 | 1/2012 | Billman et al. | |
| 8,773,655 B2 * | 7/2014 | Cheng ........................ | G01J 1/42 |
| | | | 356/213 |
| 2009/0051933 A1 | 2/2009 | Stimpson et al. | |
| 2012/0033231 A1 | 2/2012 | Kiyose | |
| 2018/0040117 A1 | 2/2018 | Castro et al. | |
| 2021/0018759 A1 | 1/2021 | Chen | |

FOREIGN PATENT DOCUMENTS

| | | | | | |
|---|---|---|---|---|---|
| CN | 105676356 A * | 6/2016 | ........... | G02B 6/2555 |
| CN | 208419959 U | 1/2019 | | |
| CN | 209380223 U | 9/2019 | | |
| CN | 111522075 A | 8/2020 | | |
| CN | 211348906 U | 8/2020 | | |
| CN | 212586252 U | 2/2021 | | |
| CN | 113884001 A | 1/2022 | | |
| WO | 2007078551 A2 | 7/2007 | | |

* cited by examiner

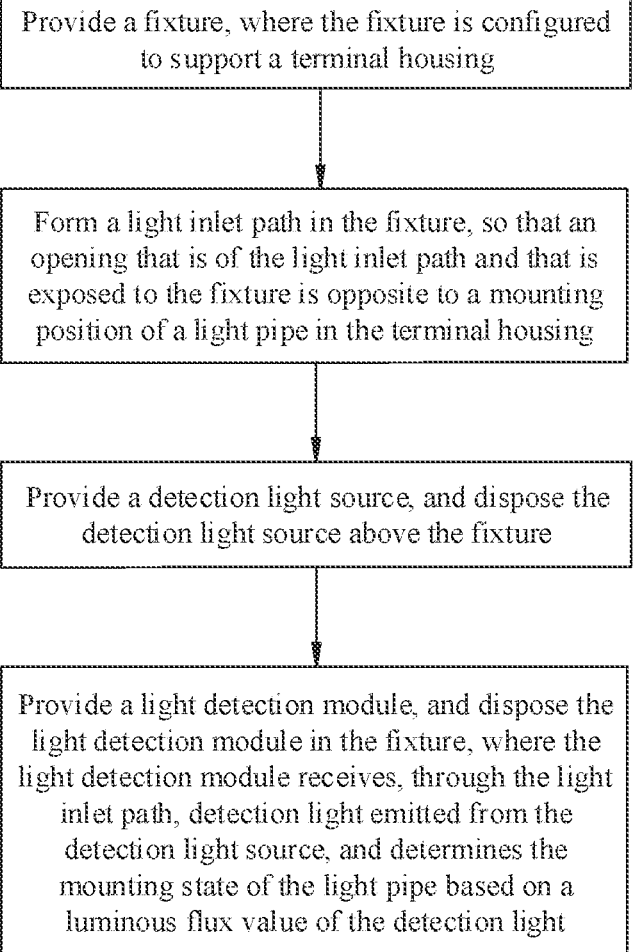

Provide a fixture, where the fixture is configured to support a terminal housing Form a light inlet path in the fixture, so that an opening that is of the light inlet path and that is exposed to the fixture is opposite to a mounting position of a light pipe in the terminal housing Provide a detection light source, and dispose the detection light source above the fixture Provide a light detection module, and dispose the light detection module in the fixture, where the light detection module receives, through the light inlet path, detection light emitted from the detection light source, and determines the mounting state of the light pipe based on a luminous flux value of the detection light

FIG. 15

APPARATUS AND METHOD FOR DETECTING MOUNTING STATE OF LIGHT PIPE IN TERMINAL

CROSS-REFERENCE TO RELATED APPLICATIONS

This application is a National Stage of International Application No. PCT/CN2022/090322, filed on Apr. 29, 2022, which claims priority to Chinese Patent Application No. 202110687705.5, filed on Jun. 21, 2021 and Chinese Patent Application No. 202110774373.4, filed on Jul. 8, 2021, all of which are hereby incorporated by reference in their entireties.

TECHNICAL FIELD

This application relates to the field of electronic product detection device technologies, and in particular, to an apparatus and a method for detecting a mounting state of a light pipe in a terminal.

BACKGROUND

In recent years, with the continuous advancement of technologies, multi-functionality of terminals such as a mobile phone has also been continuously improved and developed. For example, for sensing of external ambient light, the terminal may transmit the external ambient light into the terminal by using a light guide component that is exposed to a listening hole or a sound hole, so as to implement sensing of the external ambient light by the terminal.

Accuracy of sensing the external ambient light by the terminal depends on accuracy of a mounting position of the light guide component in the terminal. Therefore, it is extremely important that the light guide component is properly mounted in the terminal. However, because the light guide component is mounted in the terminal, has a relatively small size, and is difficult to be observed, it is difficult to effectively detect whether the light guide component is properly mounted and whether the light guide component is not mounted.

SUMMARY

An objective of embodiments of this application is to provide an apparatus and a method for detecting a mounting state of a light pipe in a terminal, so as to accurately detect whether the light pipe is properly mounted and whether the light pipe is not mounted.

To achieve the foregoing objective, this application uses the following technical solutions:

According to a first aspect, an apparatus for detecting a mounting state of a light pipe in a terminal are provided, including a fixture, a detection light source, and a light detection module. The fixture is configured to support a terminal housing, and a light inlet path is formed in the fixture. An opening that is of the light inlet path and that is exposed to the fixture is opposite to a mounting position of a light pipe in the terminal housing, and the light inlet path is used to allow light transmitted by the light pipe to pass through.

The detection light source is disposed above the fixture, and is configured to emit detection light to the light pipe. The light detection module is disposed in the fixture, and receives, through the light inlet path, the detection light emitted from the detection light source. The light detection module is configured to determine a mounting state of the light pipe based on a luminous flux value of the detection light.

In the apparatus for detecting a mounting state of a light pipe in a terminal in this embodiment of this application, the detection light source of the detection apparatus is disposed above the fixture, the detection light emitted from the detection light source may simulate external ambient light, and the detection light can pass through the mounting position of the light pipe in the terminal housing, and is transmitted, through the light inlet path of the fixture, to the light detection module that is located in the fixture. Due to cases in which the light pipe is properly mounted in the terminal housing, the mounting position is deviated, the light pipe is not mounted, or the like, the luminous flux value of the detection light that is transmitted to the light detection module through the mounting position of the light pipe and the light inlet path in the terminal housing varies accordingly. In this case, when there is a need to determine the mounting state of the light pipe in the terminal housing, only the terminal housing in which a process of mounting the light pipe is performed needs to be placed on the fixture, and the detection light source needs to be turned on, so that after the light detection module receives the detection light emitted from the detection light source, the mounting state of the light pipe in the terminal housing may be determined based on the obtained luminous flux value of the detection light, so as to implement fast, accurate, and contactless detection of the mounting state of the light pipe.

Optionally, the light detection module includes a detection module, a data processing module, and an output module. The detection module is configured to obtain the luminous flux value of the detection light emitted into the fixture through the light inlet path; the data processing module is configured to compare the luminous flux value with a preset threshold to obtain a signal indicating the mounting state of the light pipe; and the output module is configured to output and/or display the signal indicating the mounting state of the light pipe.

The output module may be a display apparatus such as a display, or may be a communication module that is communicatively connected to an external could device such as a Wi-Fi module, a 4G module, a 5G module, and a communication interface supporting an I2C (Inter-Integrated Circuit) or an SPI (Serial Peripheral Interface). The data processing module and the output module may be integrated on the detection module, to reduce an overall size of the light detection module.

Optionally, the detection module includes a first chip. The first chip is opposite to the opening that is of the light inlet path and that is exposed to the fixture, and is configured to obtain a first luminous flux value that is of the detection light emitted into the fixture through the light inlet path and that is in a principal axis direction of the light inlet path.

The threshold includes a first threshold and a second threshold; and the data processing module is configured to compare the first luminous flux value with the first threshold and the second threshold.

When the first luminous flux value is greater than or equal to the first threshold and is less than or equal to the second threshold, the data processing module outputs a signal indicating that the light pipe is properly mounted; or when the first luminous flux value is less than the first threshold, the data processing module outputs a signal indicating that the mounting position of the light pipe is deviated; or when the first luminous flux value is greater than the second threshold, the data processing module outputs a signal indicating that the light pipe is not mounted.

Optionally, the detection module further includes a second chip. The second chip is configured to obtain a second luminous flux value of the detection light that is emitted into the fixture through the light inlet path and that deviates from the principal axis direction of the light inlet path.

The threshold further includes a third threshold and a fourth threshold; and the data processing module is configured to compare the first luminous flux value with the first threshold and the second threshold, and is also configured to compare a percentage of a ratio of the second luminous flux value to the first luminous flux value with the third threshold and the fourth threshold.

When the first luminous flux value is greater than or equal to the first threshold and is less than or equal to the second threshold, and the percentage of the ratio of the second luminous flux value to the first luminous flux value is less than or equal to the third threshold and is greater than or equal to the fourth threshold, the data processing module outputs a signal indicating that the light pipe is properly mounted; or when the first luminous flux value is less than the first threshold, the data processing module outputs a signal indicating that the mounting position of the light pipe is deviated; or when the percentage of the ratio of the second luminous flux value to the first luminous flux value is greater than the third threshold or less than the fourth threshold, the data processing module outputs a signal indicating that the mounting position of the light pipe is deviated; or when the first luminous flux value is greater than the second threshold, and the percentage of the ratio of the second luminous flux value to the first luminous flux value is less than the fourth threshold, the data processing module outputs a signal indicating that the light pipe is not mounted.

Optionally, the detection module includes a first chip and a second chip. The first chip is opposite to the opening that is of the light inlet path and that is exposed to the fixture, and is configured to obtain a first luminous flux value that is of the detection light emitted into the fixture through the light inlet path and that is in a principal axis direction of the light inlet path; and the second chip is configured to obtain a second luminous flux value of the detection light that is emitted into the fixture through the light inlet path and that deviates from the principal axis direction of the light inlet path.

The threshold further includes a third threshold and a fourth threshold; and the data processing module is configured to compare a percentage of a ratio of the second luminous flux value to the first luminous flux value with the third threshold and the fourth threshold.

When the percentage of the ratio of the second luminous flux value to the first luminous flux value is less than or equal to the third threshold and is greater than or equal to the fourth threshold, the data processing module outputs a signal indicating that the light pipe is properly mounted.

When the percentage of the ratio of the second luminous flux value to the first luminous flux value is greater than the third threshold or less than the fourth threshold, the data processing module outputs a signal indicating that the mounting position of the light pipe is deviated.

When the percentage of the ratio of the second luminous flux value to the first luminous flux value is less than the fourth threshold, the data processing module outputs a signal indicating that the light pipe is not mounted.

Optionally, there are two second chips, and the two second chips are respectively disposed on opposite sides of the first chip.

Optionally, the fixture forms an inclined surface that is used to abut against the back of the terminal housing. A stopper that is used to limit a position of a bottom of the terminal housing is disposed at a lower edge of the inclined surface of the fixture. The opening that is of the light inlet path and that is exposed to the fixture is formed at a bottom edge the inclined surface facing the fixture.

Optionally, the fixture further includes a base and a support member. The support member is detachably disposed on the base, the inclined surface is formed on the support member, the stopper is disposed at a lower end of the support member, the light inlet path is formed in the support member, an accommodation cavity that is used to accommodate the light detection module is provided at a bottom of the support member, and the light inlet path and the accommodation cavity are communicated.

Optionally, a cable trough is disposed at the bottom of the support member. An opening on one side of the cable trough is exposed to a side wall of the support member, and an opening on the other side of the cable trough and the accommodation cavity are communicated, so that a cable connected to the light detection module can be hidden in the support member.

Optionally, the support member may be connected to or embedded in the base by using a bolt.

Optionally, the support member includes an oblique supporting block and a horizontal supporting block. The inclined surface is formed on the oblique supporting block, and the oblique supporting block is detachably disposed on the base. The horizontal supporting block is disposed at a lower edge of the oblique supporting block, the stopper is disposed on the horizontal supporting block, and the accommodation cavity is formed at a bottom of the horizontal supporting block. The oblique supporting block and the horizontal supporting block may be integrally cast.

Optionally, the fixture further includes a base and an oblique supporting block. The inclined surface is formed on the oblique supporting block, and the oblique supporting block is detachably disposed on the base. The stopper is disposed on the base and is adjacent to the oblique supporting block. The light inlet path is formed in the base, and an accommodation cavity that is used to accommodate the light detection module is provided at a bottom of the base. The light inlet path and the accommodation cavity are communicated.

Optionally, a projection of an opening that is of the light inlet path and that is exposed to the accommodation cavity covers the light detection module in a height direction of the fixture.

Optionally, the fixture further includes a positioning pin, and the positioning pin is disposed on the inclined surface and is configured to fasten the terminal housing.

Optionally, the fixture further includes two clamping blocks, and the two clamping blocks are detachably disposed on the inclined surface. The two clamping blocks are disposed at intervals, and are configured to clamp the terminal housing.

Optionally, the apparatus for detecting a mounting state of a light pipe in a terminal further includes a box body. The fixture is disposed in the box body, and the detection light source is disposed on an inner top of the box body.

According to a second aspect, a method for detecting a mounting state of a light pipe in a terminal is provided. The detection method includes the following steps:

provide a fixture, where the fixture is configured to support a terminal housing;

form a light inlet path in the fixture, so that an opening that is of the light inlet path and that is exposed to the fixture is opposite to a mounting position of the light pipe in the terminal housing;

provide a detection light source, where the detection light source is disposed above the fixture; and provide a light detection module, and dispose the light detection module in the fixture, where the light detection module receives, through the light inlet path, detection light emitted from the detection light source, and determines the mounting state of the light pipe based on a luminous flux value of the detection light.

When the method for detecting a mounting state of a light pipe in a terminal provided in this embodiment of this application is implemented, the detection light source emits the detection light to the mounting position of the light pipe in the terminal housing, and the detection light reaches the light detection module through the mounting position of the light pipe and the light inlet path, so that the light detection module can obtain the luminous flux value of the detection light. In this case, due to cases in which the light pipe is properly mounted in the terminal housing, the mounting position of the light pipe is deviated, the light pipe is not mounted, or the like, the luminous flux value of the detection light that is transmitted to the light detection module through the light inlet path and the mounting position of the light pipe in the terminal housing varies accordingly. In this way, the light detection module can determine the mounting state of the light pipe in the terminal housing based on the obtained luminous flux value of the detection light, so as to implement fast, accurate, and contactless detection of the mounting state of the light pipe.

Optionally, that the light detection module receives, through the light inlet path, detection light emitted from the detection light source, and determines the mounting state of the light pipe based on a luminous flux value of the detection light includes:

The light detection module obtains a first luminous flux value that is of the detection light emitted into the fixture through the light inlet path and that is in a principal axis direction of the light inlet path, and compares the first luminous flux value with a preset first threshold and a preset second threshold.

When the first luminous flux value is greater than or equal to the first threshold and is less than or equal to the second threshold, the light detection module outputs a signal indicating that the light pipe is properly mounted.

When the first luminous flux value is less than the first threshold, the light detection module outputs a signal indicating that the mounting position of the light pipe is deviated.

When the first luminous flux value is greater than the second threshold, the light detection module outputs a signal indicating that the light pipe is not mounted.

Optionally, that the light detection module receives, through the light inlet path, detection light emitted from the detection light source, and determines the mounting state of the light pipe based on a luminous flux value of the detection light includes:

The light detection module obtains a first luminous flux value that is of the detection light emitted into the fixture through the light inlet path and that is in a principal axis direction of the light inlet path, and compares the first luminous flux value with a preset first threshold and a preset second threshold; and the light detection module obtains a second luminous flux value of the detection light that is emitted into the fixture through the light inlet path and that deviates from the principal axis direction of the light inlet path, and compares a percentage of a ratio of the second luminous flux value to the first luminous flux value with a preset third threshold and a preset fourth threshold.

When the first luminous flux value is greater than or equal to the first threshold and is less than or equal to the second threshold, and the percentage of the ratio of the second luminous flux value to the first luminous flux value is less than or equal to the fourth threshold, the light detection module outputs a signal indicating that the light pipe is properly mounted; or when the first luminous flux value is less than the first threshold, the light detection module outputs a signal indicating that the mounting position of the light pipe is deviated; or when the percentage of the ratio of the second luminous flux value to the first luminous flux value is greater than the third threshold or less than the fourth threshold, the light detection module outputs a signal indicating that the mounting position of the light pipe is deviated; or when the first luminous flux value is greater than the second threshold, and the percentage of the ratio of the second luminous flux value to the first luminous flux value is less than the fourth threshold, the light detection module outputs a signal indicating that the light pipe is not mounted.

Optionally, that the light detection module receives, through the light inlet path, detection light emitted from the detection light source, and determines the mounting state of the light pipe based on a luminous flux value of the detection light includes:

The light detection module obtains a first luminous flux value that is of the detection light emitted into the fixture through the light inlet path and that is in a principal axis direction of the light inlet path, and obtains a second luminous flux value of the detection light that is emitted into the fixture through the light inlet path and that deviates from the principal axis direction of the light inlet path; and the light detection module compares a percentage of a ratio of the second luminous flux value to the first luminous flux value with a preset third threshold and a preset fourth threshold. When the percentage of the ratio of the second luminous flux value to the first luminous flux value is less than or equal to the preset third threshold and is greater than or equal to the preset fourth threshold, the light detection module outputs a signal indicating that the light pipe is properly mounted; or when the percentage of the ratio of the second luminous flux value to the first luminous flux value is greater than the third threshold or less than the fourth threshold, the light detection module outputs a signal indicating that the mounting position of the light pipe is deviated; or when the percentage of the ratio of the second luminous flux value to the first luminous flux value is less than the fourth threshold, the light detection module outputs a signal indicating that the light pipe is not mounted.

BRIEF DESCRIPTION OF DRAWINGS

To describe the technical solutions in the embodiments of this application more clearly, the following briefly describes the accompanying drawings required for describing the embodiments or the conventional technology. Apparently, the accompanying drawings in the following descriptions merely show some embodiments of this application, and a person of ordinary skill in the art may still derive others drawings from these accompanying drawings without creative efforts.

FIG. 15 is a flowchart of steps of a method for detecting a mounting state of a light pipe in a terminal according to an embodiment of this application.

Figure 1:
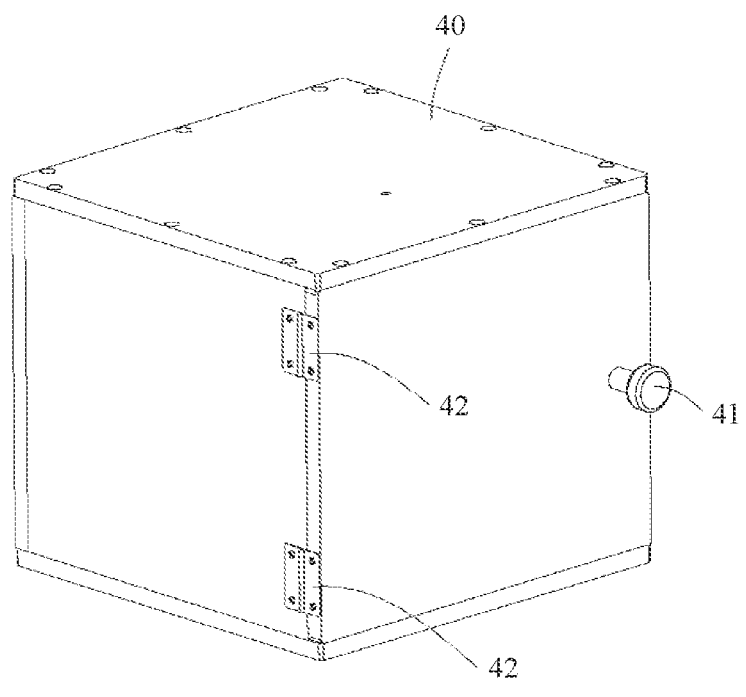
FIG. 1 is a schematic diagram of a structure of an apparatus for detecting a mounting state of a light pipe in a terminal according to an embodiment of this application.

Reference numerals in figures are as follows:

| 10-fixture | 11-light inlet path | 12-inclined surface |
| 13-stopper | 14-base | 15- support member |
| 16-oblique supporting block | 17-horizontal supporting block | 18-positioning pin |
| 19-clamping block | 20-detection light source | 30-light detection module |
| 31-detection module | 32-first chip | 33-second chip |
| 34-PCB board | 40-box body | 41-doorknob |
| 42-hinge | 50-terminal housing | 51-light pipe |

-continued

| 111-accommodation cavity | 112-cable trough | 121-limiting bar |

DESCRIPTION OF EMBODIMENTS

Embodiments of this application are described in detail below, and examples of the embodiments are shown in the accompanying drawings, where the same or similar reference numerals always indicate the same or similar elements or elements having the same or similar functions. The embodiments described below with reference to FIG. 1 to FIG. 15 are examples and are intended to explain this application, but cannot be understood as limiting this application.

In the description of this application, it should be understood that the orientation or positional relationship indicated by the terms "length", "width", "upper", "lower", "front", "rear", "left", "right", "vertical", "horizontal", "top", "bottom", "inner", "outer", and the like, is based on the orientation or positional relationship shown in the accompanying drawings, and is only for ease of describing this application and simplifying the description, rather than indicating or implying that the apparatus or component referred to must have a specific orientation, be constructed and operated in a specific orientation, which therefore cannot be understood as a limitation to this application.

In addition, the terms "first" and "second" are used for description only, and cannot be understood as indicating or implying relative importance or implicitly indicating the quantity of indicated technical features. Therefore, the features defined with "first" and "second" may explicitly or implicitly include one or more of the features. In the description of this application, "a plurality of" means two or more, unless otherwise specifically defined.

In this application, unless otherwise specified and defined, the terms, "install", "connected to", "connect", "fix", and the like, should be understood in a broad sense, for example, a connection may be a fixed connection, or a detachable connection, or an integrated connection; or a mechanical connection or an electric connection; or a direct connection, an indirect connection based on an intermediate medium, or internal communication between two elements or a relationship of interaction between two elements. A person of ordinary skill in the art can understand specific meanings of these terms in this application based on specific situations.

To facilitate understanding by a reader, proper nouns in this application are explained below:

Luminous flux (Luminous Flux) refers to light emitted from a light source with a luminous intensity of 1 cd in a solid angle.

Cd (candela) is called kandela in Chinese, and represents a unit of the luminous intensity.

Field of vision (FOV, Field of Vision): In an optical instrument, an angle that uses a lens of the optical instrument as a vertex and that is formed by two edges of a maximum range of the lens through which an object image of a measured target can pass is referred to as a field of vision.

Attenuation ratio (Attenuation ratio) is a ratio of amplitudes in two adjacent directions in attenuation oscillation of an optical path.

With the development of technologies, functions of terminals such as a mobile phone are being constantly improved and developed. For example, in recent years, a display of a terminal such as a mobile phone has developed a function such as automatic backlight brightness adjustment. However, to implement the foregoing function, the terminal needs to be capable of sensing a change of external ambient light.

For example, to achieve a purpose of sensing the external ambient light, a solution in which a light guide component that is exposed to a sound hole is disposed in the terminal may be used. The external ambient light is transmitted into the terminal by using the light guide component, so that a related device in the terminal can obtain a parameter such as luminous flux of ambient light. Certainly, the foregoing solution for obtaining ambient light in which a light pipe is exposed to the sound hole is only one of a plurality of solutions for obtaining ambient light.

Apparently, accuracy of sensing the external ambient light by the terminal depends on accuracy of a mounting position of the light guide component in the terminal. If the light guide component is not properly mounted, an attenuation ratio of the external ambient light that is transmitted into the terminal by using the light pipe is increased. Consequently, the external ambient light that is transmitted into the terminal flickers, an error will occur in the automatic backlight brightness of the terminal, and product experience of a user of the terminal is affected. If the light guide component is not mounted, the external ambient light may directly enter the terminal through the sound hole. In this case, a field of vision of the external ambient light is significantly decreased, and consequently it is difficult for the related device in the terminal to sense the external ambient light, so that the function of the automatic backlight brightness adjustment of the terminal fails.

In addition, the light guide component needs to be exposed to an opening of a small-diameter hole such as the sound hole, and therefore a diameter of the light guide component is usually less than 0.55 mm, and a length of the light pipe is also less than or equal to 1.5 mm. Consequently, after the light pipe is mounted in the terminal, it is usually difficult for an operator to visually observe whether a light pipe 51 is mounted in an accurate position and whether the light guide component is not mounted.

To resolve the foregoing problems, an embodiment of this application provides an apparatus for detecting a mounting state of a light pipe in a terminal, so as to accurately detect whether the light pipe 51 is properly mounted in the terminal, whether the light pipe 51 is not mounted, or the like. In this embodiment, the terminal may be a mobile terminal device such as a mobile phone, a tablet computer, and a laptop computer, or may be a large-scale device such as a desktop computer and a communication base station.

Specifically, according to a first aspect, referring to FIG. 1 to FIG. 4, an apparatus for detecting a mounting state of a light pipe in a terminal in this embodiment includes a fixture 10, a detection light source 20, and a light detection module 30. The fixture 10 is configured to support a terminal housing 50, and a light inlet path 11 is formed in the fixture 10. An opening that is of the light inlet path 11 and that is exposed to the fixture 10 is opposite to a mounting position of the light pipe 51 in the terminal housing 50, and the light inlet path 11 is used to allow light transmitted by the light pipe 51 to pass through.

More specifically, the detection light source 20 is disposed above the fixture 10, and is configured to emit detection light to the light pipe 51. The detection light source 20 may be disposed just above the mounting position of the light pipe 51 in the terminal housing 50. The light detection module 30 is disposed in the fixture 10, and receives, through the light inlet path 11, the detection light emitted from the detection light source 20, and the light detection module 30 is configured to determine the mounting state of the light pipe 51 based on a luminous flux value of the detection light. The light detection module 30 is disposed just below the mounting position of the light pipe 51 in the terminal housing 50.

Specifically, in a process of detecting the mounting state of the light pipe 51, the terminal housing 50 in which the light pipe 51 is mounted may be placed on the fixture 10, so that the detection light source 20 is located just above the mounting position of the light pipe 51 in the terminal housing 50, and the light detection module 30 is located just below the mounting position of the light pipe 51 in the terminal housing 50. The terminal housing 50 is open, and therefore the detection light emitted from the detection light source 20 that is disposed above the fixture 10 may be directly emitted to the light pipe 51, and reaches the light detection module 30 through transmission and diffusion that are performed by the light pipe 51 or through the mounting position of the light pipe 51. In this case, the light is transmitted bidirectionally, and therefore the foregoing detection solution can better reversely simulate a case in which the external ambient light is directly emitted into the terminal through the mounting position of the light pipe 51 in the terminal housing 50.

Figure 2:
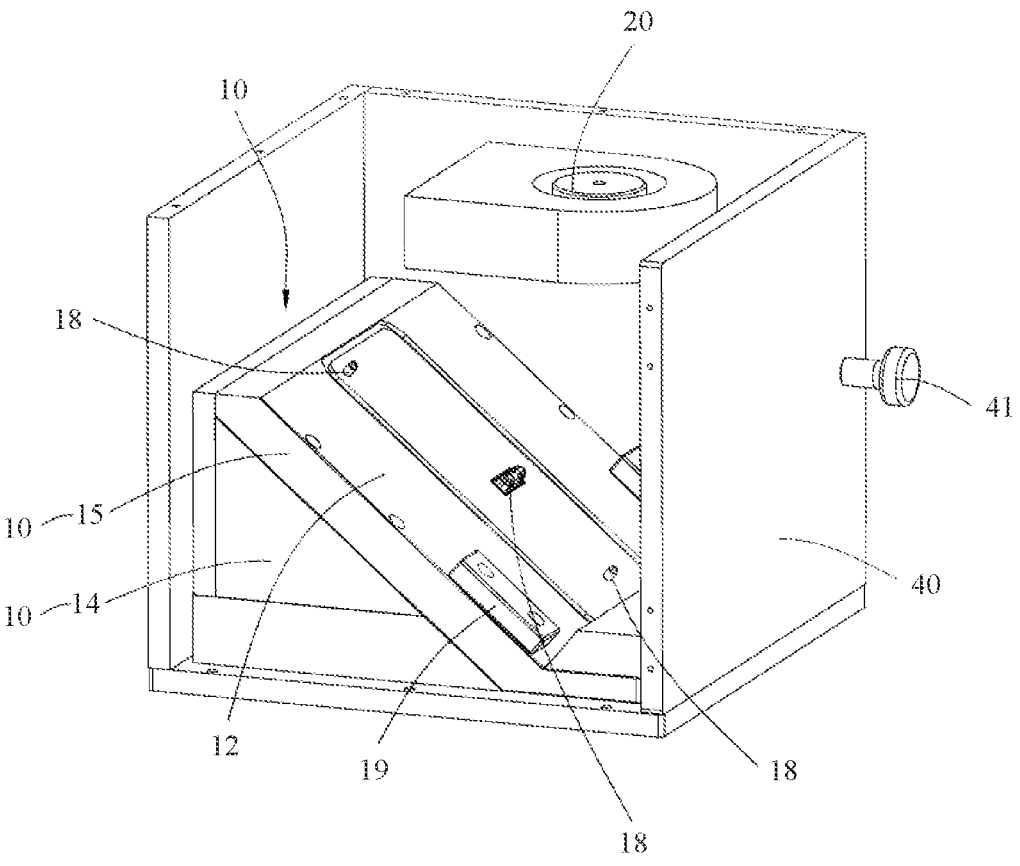
FIG. 2 is a schematic diagram 1 of a part of a structure of an apparatus for detecting a mounting state of a light pipe in a terminal according to an embodiment of this application.
Figure 3:
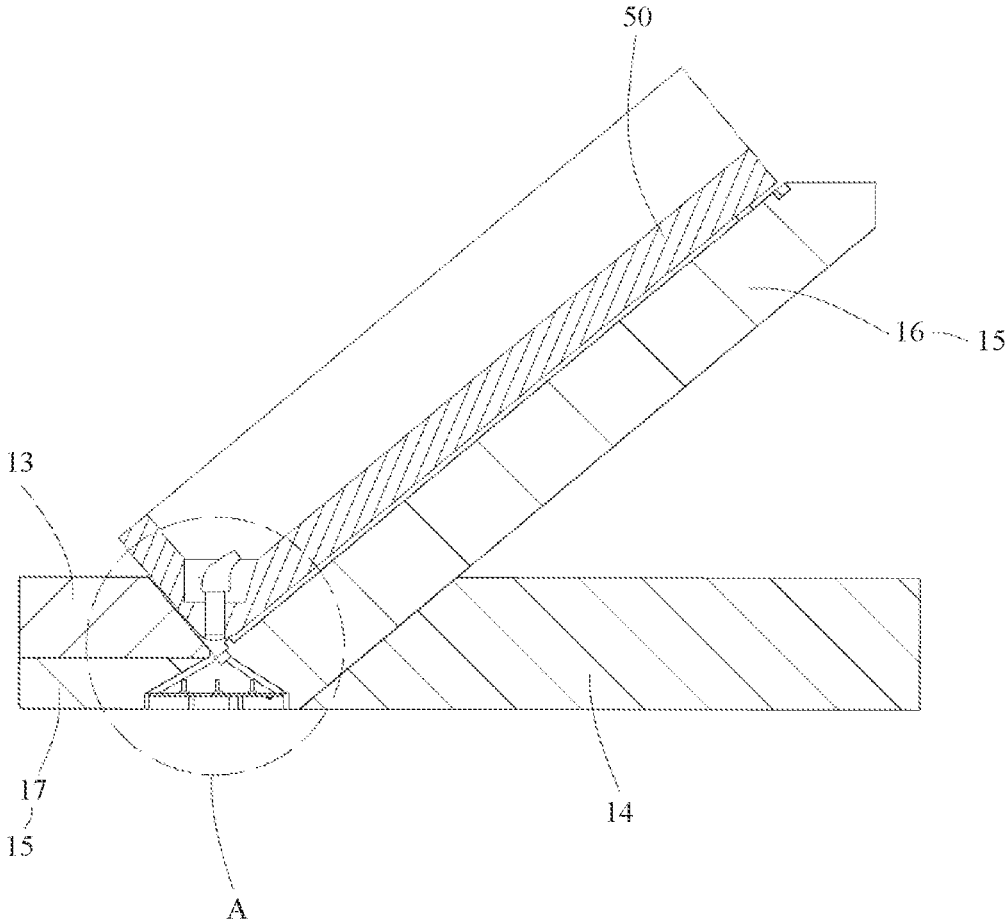
FIG. 3 is a sectional view of a part of a structure of an apparatus for detecting a mounting state of a light pipe in a terminal according to an embodiment of this application.
Figure 4:
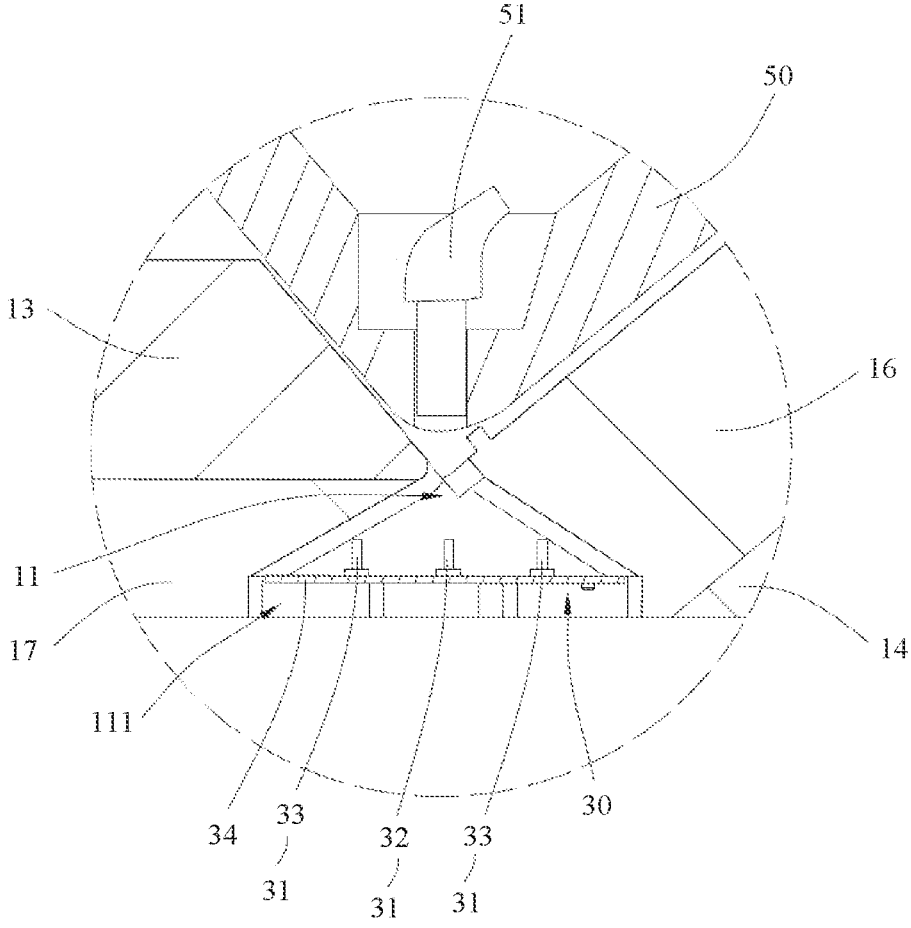
FIG. 4 is a partial enlarged view of A shown in FIG. 3.

Referring to FIG. 2 to FIG. 4, the apparatus for detecting a mounting state of a light pipe in a terminal provided in this embodiment of this application is further described below. In the apparatus for detecting a mounting state of a light pipe in a terminal, the detection light source 20 of the detection apparatus is disposed above the fixture 10. The detection light emitted from the detection light source may simulate the external ambient light. The detection light can pass through the mounting position of the light pipe 51 in the terminal housing 50, and is transmitted, through the light inlet path 11 of the fixture 10, to the light detection module 30 that is located in the fixture 10. Due to cases in which the light pipe 51 is properly mounted in the terminal housing 50, the mounting position is deviated, the light pipe 51 is not mounted, or the like, the luminous flux value of the detection light that is transmitted to the light detection module 30 through the mounting position of the light pipe 51 in the terminal housing 50 and the light inlet path 11 varies accordingly. In this case, when there is a need to determine the mounting state of the light pipe 51 in the terminal, only the terminal housing 50 in which a process of mounting the light pipe 51 is performed needs to be placed on the fixture 10, and the detection light source 20 needs to be turned on, so that after the light detection module 30 receives the detection light emitted from the detection light source 20, the mounting state of the light pipe 51 in the terminal housing 50 may be determined based on the obtained luminous flux value of the detection light, so as to implement fast, accurate, and contactless detection of the mounting state of the light pipe 51.

In some other embodiments, as shown in FIG. 4, the light detection module 30 includes a detection module 31, a data processing module, and an output module. The detection module 31 is configured to obtain the luminous flux value of the detection light emitted into the fixture 10 through the light inlet path 11; the data processing module is configured to compare the luminous flux value with a preset threshold to obtain a signal indicating the mounting state of the light pipe 51; and the output module is configured to output and/or display the signal indicating the mounting state of the light pipe 51.

Specifically, in the process of detecting the mounting state of the light pipe 51, there is a need to evaluate an indicator such as the luminous flux value of the detection light received by the detection module 31 of the light detection module 30. When a luminous flux value of detection light in a specific direction or a percentage of a ratio between luminous flux values of detection light in different directions is greater than a specific value, less than a specific value, or between the two values, it indicates that the mounting state of the light pipe 51 is deviated, the light pipe 51 is not mounted, or the light pipe 51 is properly mounted. In this case, based on an evaluation indicator of an optical parameter, the data processing module first experimentally determines, in different cases in which the light pipe 51 is mounted in the deviated position, is not mounted, or is properly mounted, a critical value of the luminous flux value of the detection light obtained by the detection module 31 or a critical value of a percentage of a ratio between different luminous flux values, and uses the critical value as a threshold. In this case, after the detection module 31 obtains the luminous flux value of the detection light, the data processing module can compare the luminous flux value or the percentage of the ratio between different luminous flux values with a corresponding threshold. The mounting state of the light pipe 51 determines the luminous flux value of the detection light transmitted by using the light pipe 51, and therefore the data processing module can determine the mounting state of the light pipe 51 based on a comparison result, and transmits the signal indicating the mounting state of the light pipe 51 to the output module. For example, based on a comparison of the luminous flux value and the threshold, the data processing module may output a signal indicating that light pipe 51 is properly mounted, a signal indicating that the mounting position of the light pipe 51 is deviated, or a signal indicating that the light pipe 51 is not mounted, and the output module may output the signal to an external device.

For example, the output module may be a display apparatus such as a display, or may be a communication module that is communicatively connected to an external could device such as a Wi-Fi module, a 4G module, a 5G module, and a communication interface supporting an I2C (Inter-Integrated Circuit) or an SPI (Serial Peripheral Interface).

For example, the data processing module may be a programmable logic controller. The data processing module and the output module may be integrated on the detection module 31, to reduce an overall size of the light detection module 30.

Figure 5:
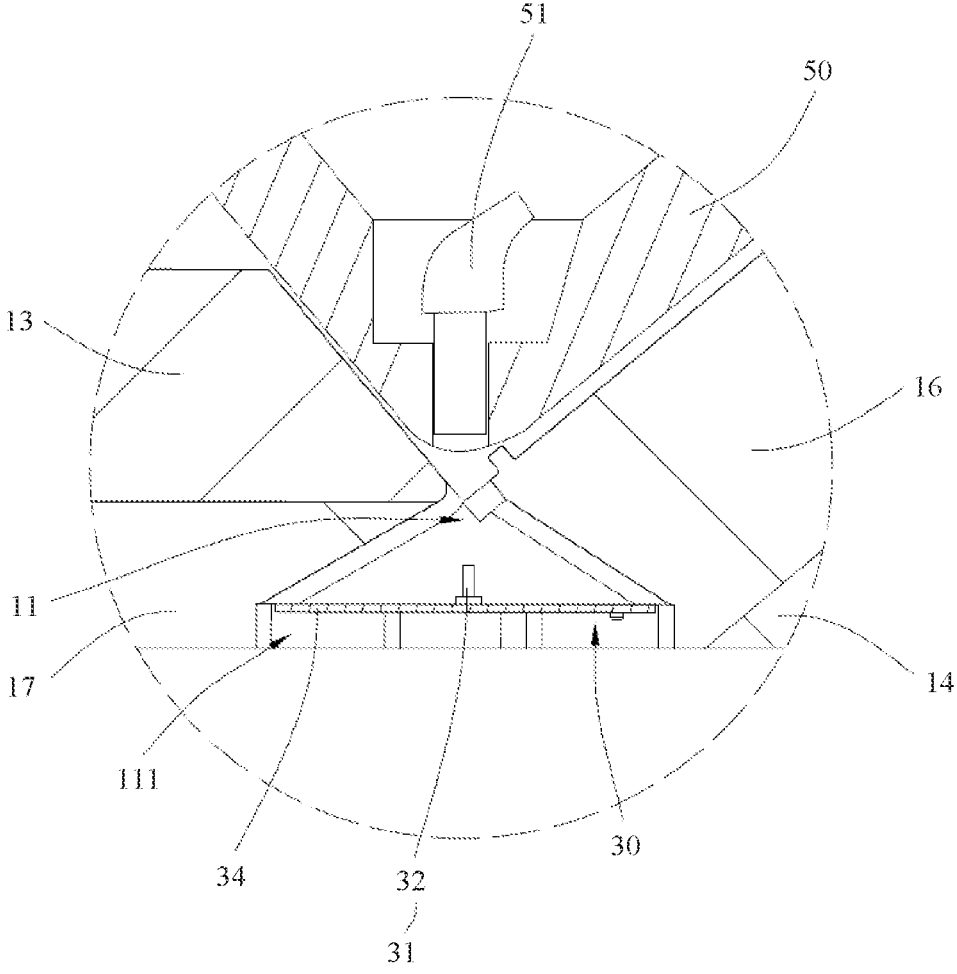
FIG. 5 is a partial enlarged view of a part of a structure of an apparatus for detecting a mounting state of a light pipe in a terminal according to an embodiment of this application.
Figure 6:
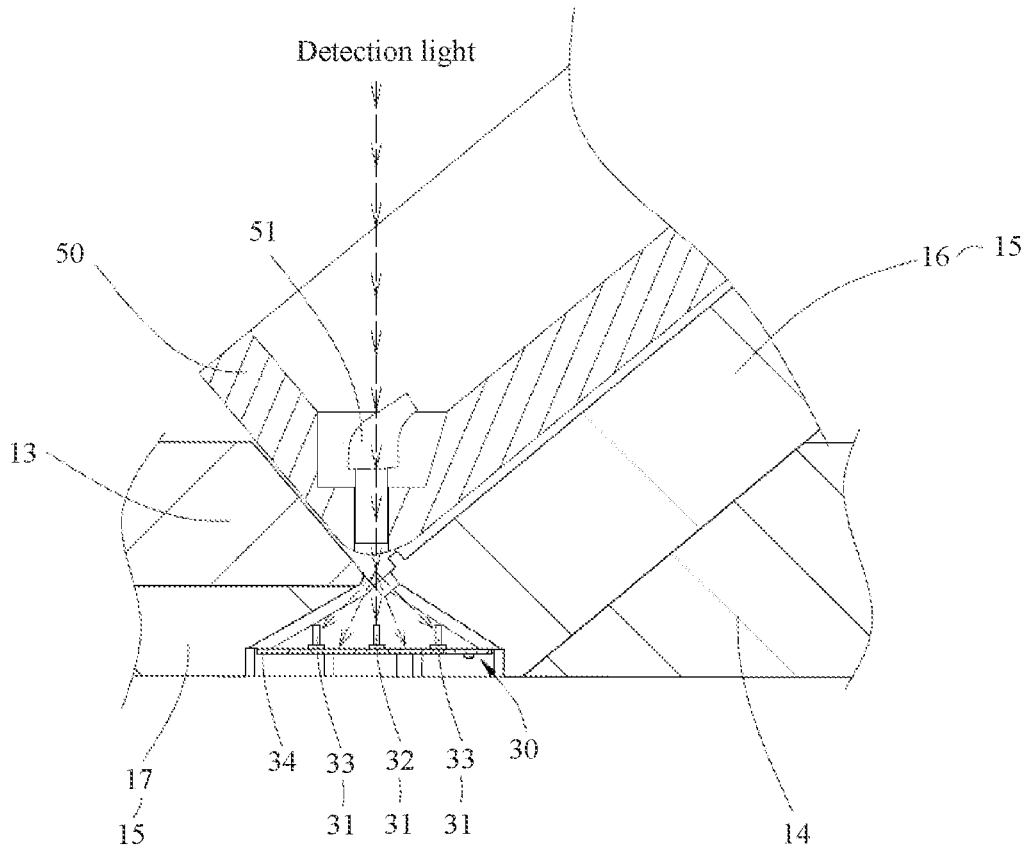
FIG. 6 is a diagram of an optical path of detection light of an apparatus for detecting a mounting state of a light pipe in a terminal according to an embodiment of this application.

In some other embodiments of this application, as shown in FIG. 3 and FIG. 5, in the first manner of determining the mounting state of the light pipe 51, the detection module 31 includes a first chip 32. The first chip 32 is opposite to the light inlet path 11 that is exposed to the opening of the fixture 10, and is configured to obtain a first luminous flux value that is of the detection light emitted into the fixture 10 through the light inlet path 11 that is in a principal axis direction of the light inlet path 11.

Specifically, the threshold includes a first threshold and a second threshold. The data processing module is configured to compare the first luminous flux value with the first threshold and the second threshold. In this case, when the first luminous flux value is greater than or equal to the first threshold and is less than or equal to the second threshold, the data processing module may output a signal indicating that the light pipe 51 is properly mounted; or when the first luminous flux value is less than the first threshold, the data processing module outputs a signal indicating that the mounting position of the light pipe 51 is deviated; or when the first luminous flux value is greater than the second threshold, the data processing module outputs a signal indicating that the light pipe 51 is not mounted.

In this way, the first chip 32 of the light detection module 31 first obtains the first luminous flux value that is of the detection light emitted into the fixture 10 through the light inlet path 11 and that is in the principal axis direction of the light inlet path 11, and transmits the first luminous flux value to the data processing module. The data processing module compares the first luminous flux value with the first threshold and the second threshold. In this case, when the first luminous flux value is between the first threshold and the second threshold, the light pipe 51 is mounted in a correct position; or when the first luminous flux value is less than the first threshold, the light pipe 51 is mounted in a deviated position; or when the first luminous value is greater than the second threshold, the light pipe 51 is not mounted. In this way, quick determining of the mounting state of the light pipe 51 in the terminal housing 50 is implemented simply and reliably.

In some other embodiments of this application, as shown in FIG. 2 to FIG. 4 and FIG. 6, in the second manner of determining the mounting state of the light pipe 51, the detection module 31 includes a first chip 32 and a second chip 33. Both the first chip 32 and the second chip 33 are photosensor chips. The first chip 32 is opposite to the light inlet path 11 that is exposed to the opening of the fixture 10, so that the first chip 32 can obtain a first luminous flux value that is of the detection light emitted into the fixture 10 through the light inlet path 11 that is in a principal axis direction of the light inlet path 11. The second chip 33 is configured to obtain a second luminous flux value of the detection light that is emitted into the fixture 10 through the light inlet path 11 and that deviates from the principal axis direction of the light inlet path 11.

Specifically, the threshold includes a first threshold, a second threshold, a third threshold, and a fourth threshold. The first threshold is less than the second threshold, and the fourth threshold is less than the third threshold. Values between the first threshold and the second threshold indicate a value interval of the first luminous flux value when the light pipe 51 is properly mounted. Values between the third threshold and the fourth threshold indicate a value interval of a ratio of the second luminous flux value to the first luminous flux value when the light pipe 51 is properly mounted.

More specifically, the data processing module is configured to compare the first luminous flux value with the first threshold and the second threshold, and is also configured to compare the percentage of the ratio of the second luminous flux value to the first luminous flux value with the third threshold and the fourth threshold.

Figure 10:
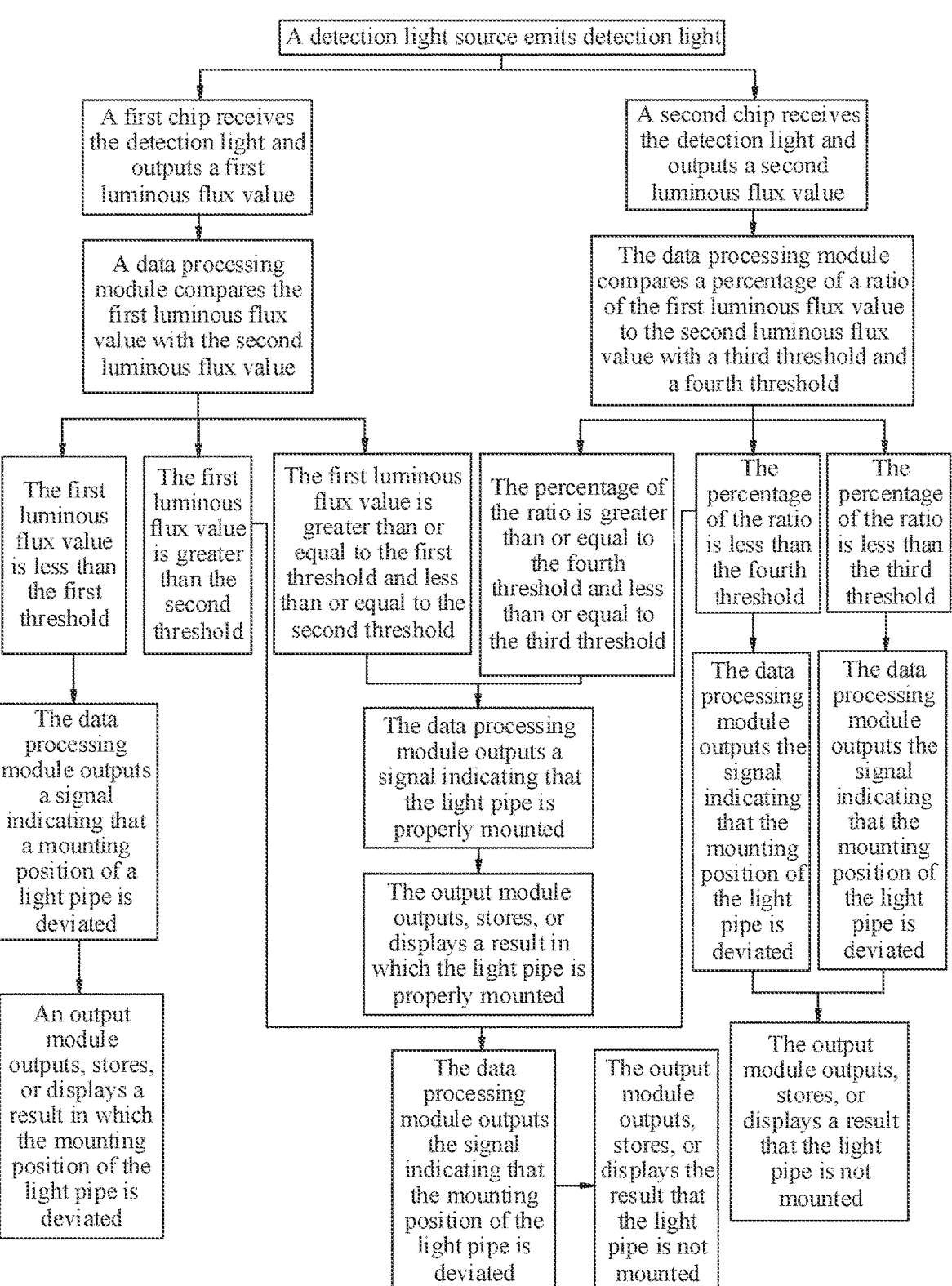
FIG. 10 is a diagram of control logic of an apparatus for detecting a mounting state of a light pipe in a terminal according to an embodiment of this application.

Referring to FIG. 10, when the first luminous flux value is greater than or equal to the first threshold and is less than or equal to the second threshold, and the percentage of the ratio of the second luminous flux value to the first luminous flux value is less than or equal to the third threshold and is greater than or equal to the fourth threshold, the data processing module outputs a signal indicating that the light pipe 51 is properly mounted. That is, it can be determined that the light pipe 51 is properly mounted only when the first luminous flux value is within the value interval between the first threshold and the second threshold and the percentage of the ratio of the second luminous flux value to the first luminous flux value is within the value interval between the third threshold and the fourth threshold. In this way, accuracy of determining a state in which the light pipe 51 is properly mounted in the terminal housing 50 can be better improved.

In addition, provided that a condition in which the first luminous flux value is less than the first threshold, the percentage of the ratio of the second luminous flux value to the first luminous flux value is greater than the third threshold, or the percentage of the ratio of the second luminous flux value to the first luminous flux value is less than the fourth threshold is met, in this case, it indicates that the mounting position of the light pipe 51 is deviated, resulting in an abnormal first luminous flux value or percentage of the ratio of the second luminous flux value to the first luminous flux value. In this case, the data processing module may output a signal indicating that the mounting position of the light pipe 51 is deviated. In this way, accuracy of determining that the mounting position of the light pipe 51 is deviated in the terminal housing 50 can be better improved.

Alternatively, when the first luminous flux value is greater than the second threshold, and the percentage of the ratio of the second luminous flux value to the first luminous flux value is less than the fourth threshold, in this case, it indicates that the light pipe 51 is not placed at a position in which the light pipe 51 should have been mounted in the terminal housing, and consequently the detection light is not diffused when the detection light passes through the light inlet path 11, so that the first luminous flux value is greater than the second threshold, and the percentage of the ratio of the second luminous flux value to the first luminous flux value is less than the fourth threshold. In this case, the data processing module may output a signal indicating that the light pipe is not mounted. In this way, accuracy of determining that the light pipe 51 is not mounted in the terminal housing 50 can be better improved.

In some other embodiments of this application, as shown in FIG. 2 to FIG. 4 and FIG. 6, in the third manner of determining the mounting state of the light pipe 51, the detection module 31 includes a first chip 32 and a second chip 33. The first chip 32 is opposite to the light inlet path 11 that is exposed to the opening of the fixture 10, and is configured to obtain a first luminous flux value that is of the detection light emitted into the fixture 10 through the light inlet path 11 that is in a principal axis direction of the light inlet path 11, and the second chip 33 is configured to obtain a second luminous flux value of the detection light that is emitted into the fixture 10 through the light inlet path 11 and that deviates from the principal axis direction of the light inlet path 11.

Specifically, the threshold includes a third threshold and a fourth threshold. The data processing module is configured to compare a percentage of a ratio of the second luminous flux value to the first luminous flux value with the third threshold and the fourth threshold. When the percentage of the ratio of the second luminous flux value to the first luminous flux value is less than or equal to the third threshold and is greater than or equal to the fourth threshold, the data processing module outputs a signal indicating that the light pipe 51 is properly mounted; or when the percentage of the ratio of the second luminous flux value to the first luminous flux value is greater than the third threshold or less than the fourth threshold, the data processing module outputs a signal indicating that the mounting position of the light pipe 51 is deviated; or when the percentage of the ratio of the second luminous flux value to the first luminous flux value is less than the fourth threshold, the data processing module outputs a signal indicating that the light pipe 51 is not mounted.

In this embodiment, provided that a relationship between the percentage of the ratio of the second luminous flux value to the first luminous flux value and the third threshold/the fourth threshold is determined, a result of the mounting state of the light pipe 51 can be obtained, and therefore efficiency of detecting the mounting state of the light pipe 51 is improved.

For example, when the light pipe 51 is not mounted, the detection light is not diffused by using the light pipe 51, and is directly emitted to the second chip 33 and the first chip 32 through the light inlet path 11, so that the second luminous flux value obtained by the second chip 33 is relatively small. In this case, the percentage of the ratio of the second luminous flux value to the first luminous flux value will approach 1%.

Figure 7:
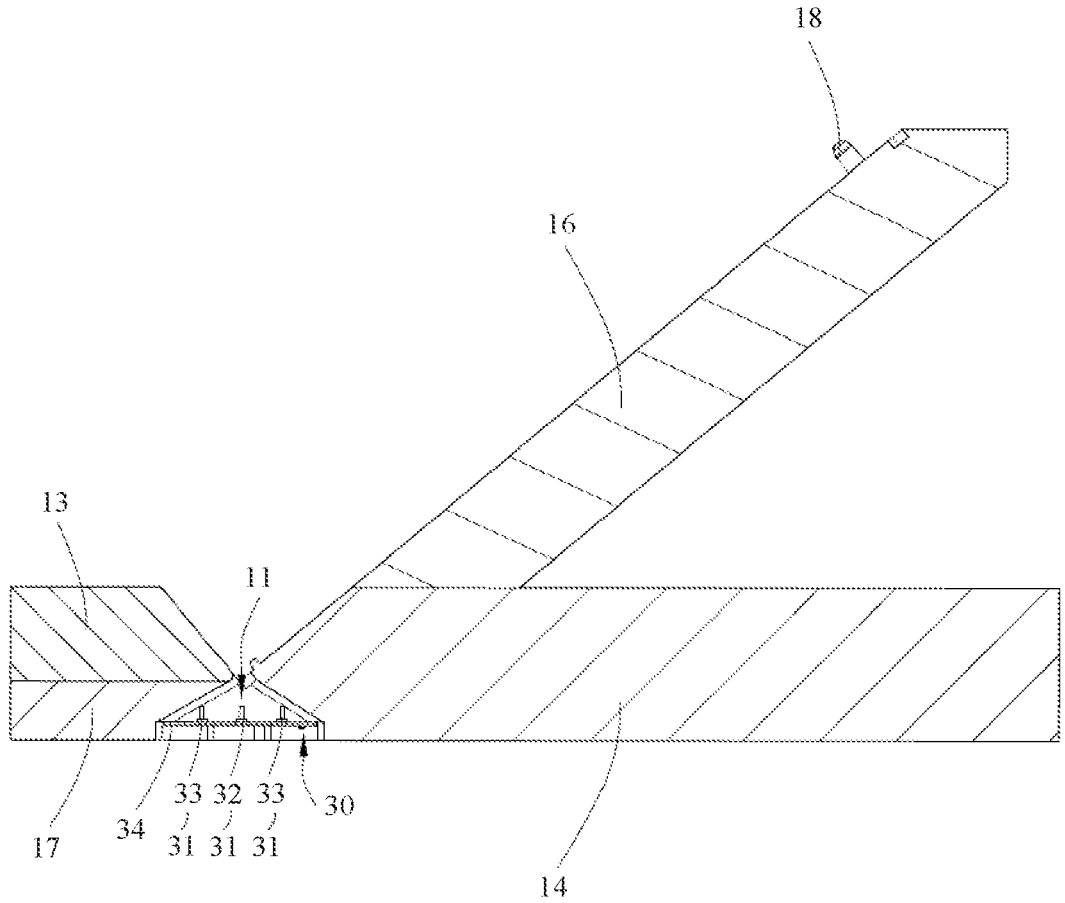
FIG. 7 is another sectional view of an apparatus for detecting a mounting state of a light pipe in a terminal according to the embodiment of this application.
Figure 8:
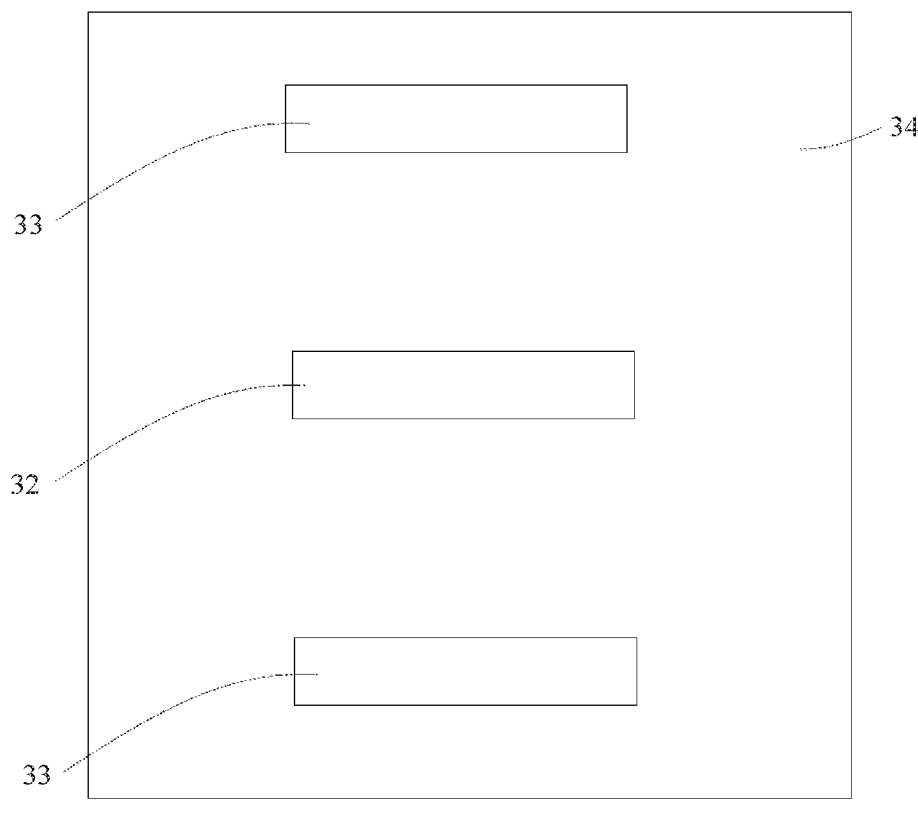
FIG. 8 is a diagram showing arrangement of a first chip and a second chip on a PCB board of an apparatus for detecting a mounting state of a light pipe in a terminal according to an embodiment of this application.

In some other embodiments of this application, as shown in FIG. 7 and FIG. 8, there are two second chip 33, and the two second chip 33 are respectively disposed on opposite sides of the first chip 32. Both the first chip 32 and the second chip 33 are disposed on a PCB board 34. Specifically, there may be a plurality of second chips 33, and therefore there may be a plurality of percentages of the ratio of the second luminous flux value to the first luminous flux value accordingly. In this case, the data processing module can compare a percentage of the ratio of the second luminous flux value to the first luminous flux value and the third threshold/the fourth threshold a plurality of times, and may output a signal indicating the mounting state of the light pipe 51 only when a plurality of comparison results are all consistent. Therefore, accuracy of determining, by the light detection module 30, a signal indicating the mounting state of the light pipe 51 is better improved.

For example, as described above, based on an evaluation of optical parameter indicators such as maximum luminous flux, field of vision, and an attenuation ratio of ambient light that is emitted into the terminal, the data processing module correspondingly stores the first threshold, the second threshold, the third threshold, and the fourth threshold. Specific examples of the optical parameter indicators, the threshold settings, and luminous flux detection items are provided. As shown in Table 1:

TABLE 1

| | | Indicators indicating that a light pipe 51 is properly mounted | Indicators indicating that a mounting position of a light pipe 51 is deviated | Indicators indicating that a light pipe 51 is not mounted |
|---|---|---|---|---|
| Related parameters of ambient light that is emitted into a terminal. | Maximum luminous flux (X-axis) | 2925 cd | 3231 cd | 5600 cd |
| | Maximum luminous flux (45° angle) | 3265 cd | 3610 cd | 5600 cd |
| | Field of vision (X-axis) | 33° | 28° | 4° |
| | Field of vision (45° angle) | 32.5° | 29° | 5° |
| | Attenuation ratio (X-axis) | 3.5 | 7 | 50 |
| Detection items of detection light that is emitted into a terminal | First luminous flux value | 1490 cd | 1383 cd | 37888 cd |
| | Percentage of a ratio of a specific second luminous flux value to a first luminous flux value | 38.51% | 12.62% | 1% |

TABLE 1-continued

|  | Indicators indicating that a light pipe 51 is properly mounted | Indicators indicating that a mounting position of a light pipe 51 is deviated | Indicators indicating that a light pipe 51 is not mounted |
| --- | --- | --- | --- |
| Percentage of a ratio of another second luminous flux value to a first luminous flux value | 20.54% | 11.19% | 1% |

In this example, a control standard for detection of the fixture 10 may be set based on an actual requirement of a test terminal: The first threshold is 1000 cd, the second threshold is 2000 cd, the third threshold is 45%, and the fourth threshold is 15%. As shown in Table 1, when the light pipe 51 is properly mounted, the first luminous flux value detected by the first chip 32 is 1490 cd. The value falls between the first threshold and the second threshold. A percentage of a ratio of a second luminous flux value obtained by one second chip 33 to the first luminous flux value is 38.51%, and a percentage of a ratio of a second luminous flux value obtained by the other second chip 33 to the first luminous flux value is 20.54%. Both the ratios fall between the third threshold and the fourth threshold, and meet a criterion for evaluating that the light pipe 51 is properly mounted.

When the mounting position of the light pipe 51 is deviated, the first luminous flux value detected by the first chip 32 is 1380 cd. The value falls between the first threshold and the second threshold. A percentage of a ratio of a second luminous flux value obtained by one second chip 33 to the first luminous flux value is 12.62%, and a percentage of a ratio of a second luminous flux value obtained by the other second chip 33 to the first luminous flux value is 11.19%. Both the ratios are less than the fourth threshold. In this case, even if the first luminous flux value falls between the first threshold and the second threshold, the ratio of the second luminous flux value to the first luminous flux value is less than the fourth threshold. Therefore, a criterion for evaluating that the mounting position of the light pipe 51 is deviated is also met.

When the light pipe 51 is not mounted, the first luminous flux value detected by the first chip 32 is 37888 cd, which is far greater than the second threshold: in addition, a percentage of a ratio of a second luminous flux value obtained by each of the two second chips 33 to the first luminous flux value is 1%, which is far less than the fourth threshold. Therefore, a criterion for evaluating that the light pipe 51 is not mounted is also met.

In an actual detection process, the apparatus for detecting a mounting state of a light pipe in a terminal provided in this embodiment of this application accurately detects the mounting state of the light pipe 51 in the terminal housing. When the apparatus for detecting a mounting state of a light pipe in a terminal detects that the light pipe 51 is properly mounted in the terminal, during an actual test process of the test terminal after start-up, the field of vision of the ambient light that is entered into the terminal and that is obtained by the terminal is greater than 30°, and the attenuation ratio is less than 4.5. In this way, an optical parameter requirement of the terminal for the ambient light is met, it indicates that the light pipe 51 is properly mounted in the terminal housing, and a detection result obtained by the apparatus for detecting a mounting state of a light pipe in a terminal is confirmed.

Figure 9:
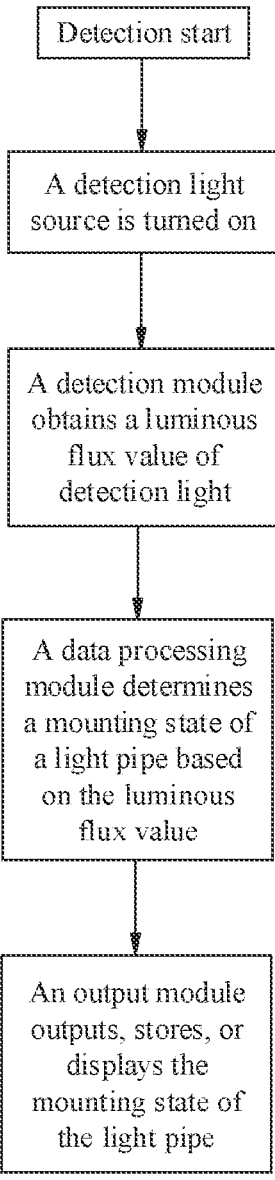
FIG. 9 is a control flowchart of an apparatus for detecting a mounting state of a light pipe in a terminal according to an embodiment of this application.

More specifically, a control flowchart and a control logic diagram of the apparatus for detecting a mounting state of a light pipe 51 in a terminal are respectively shown in FIG. 9 and FIG. 10. When detection of the mounting state of the light pipe 51 starts, a control device such as an external cloud device may send a working instruction to the detection module 31, and then the first chip 32 and the second chip 33 of the detection module 31 start to receive the detection light and respectively output the first luminous flux value and the second luminous flux value. After receiving the first luminous flux value and the second luminous flux value, the data processing module compares the first luminous flux value with the first threshold and the second threshold, and compares the percentage of the ratio of the second luminous flux value to the first luminous flux value with the third threshold and the fourth threshold, to obtain a detection result of the mounting state of the light pipe 51. The data processing module transmits the detection result of the mounting state of the light pipe 51 to the output module, and records a sequence number of the terminal housing 50 that corresponds to the detection result. Then, the output module displays or stores the detection result of the mounting state of the light pipe 51 corresponding to the terminal housing 50, or transmits the detection result to the external could device and a corresponding application.

Figure 11:
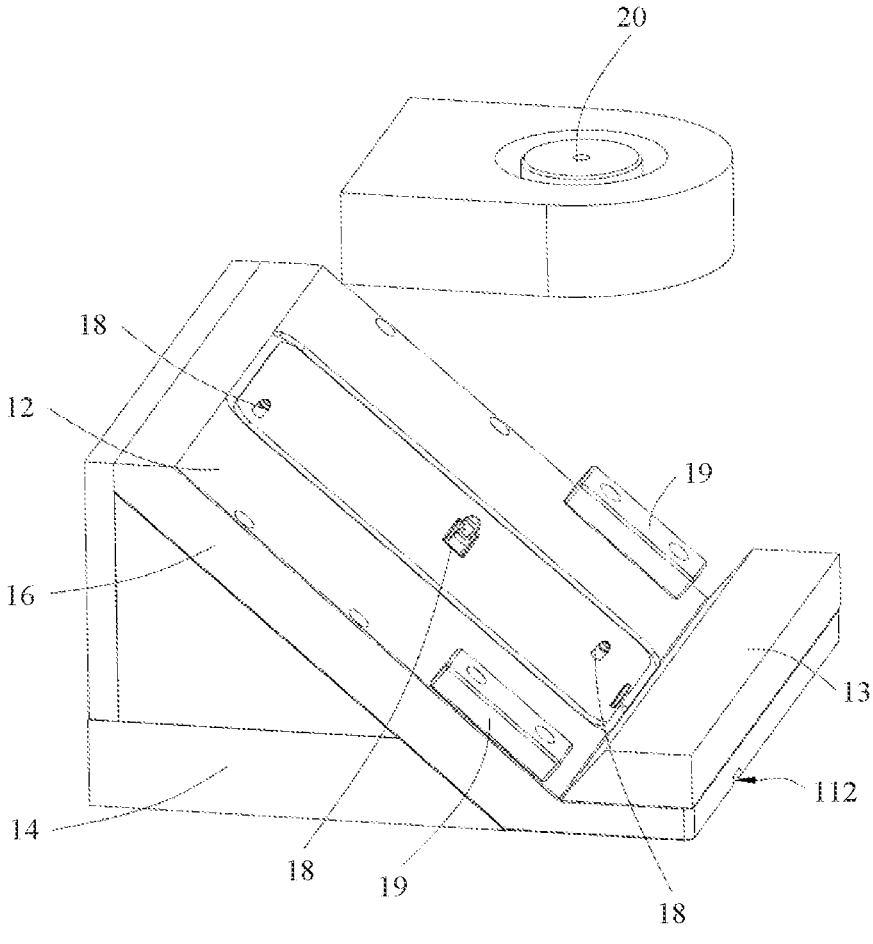
FIG. 11 is a schematic diagram 2 of a part of a structure of an apparatus for detecting a mounting state of a light pipe in a terminal according to an embodiment of this application.
Figure 12:
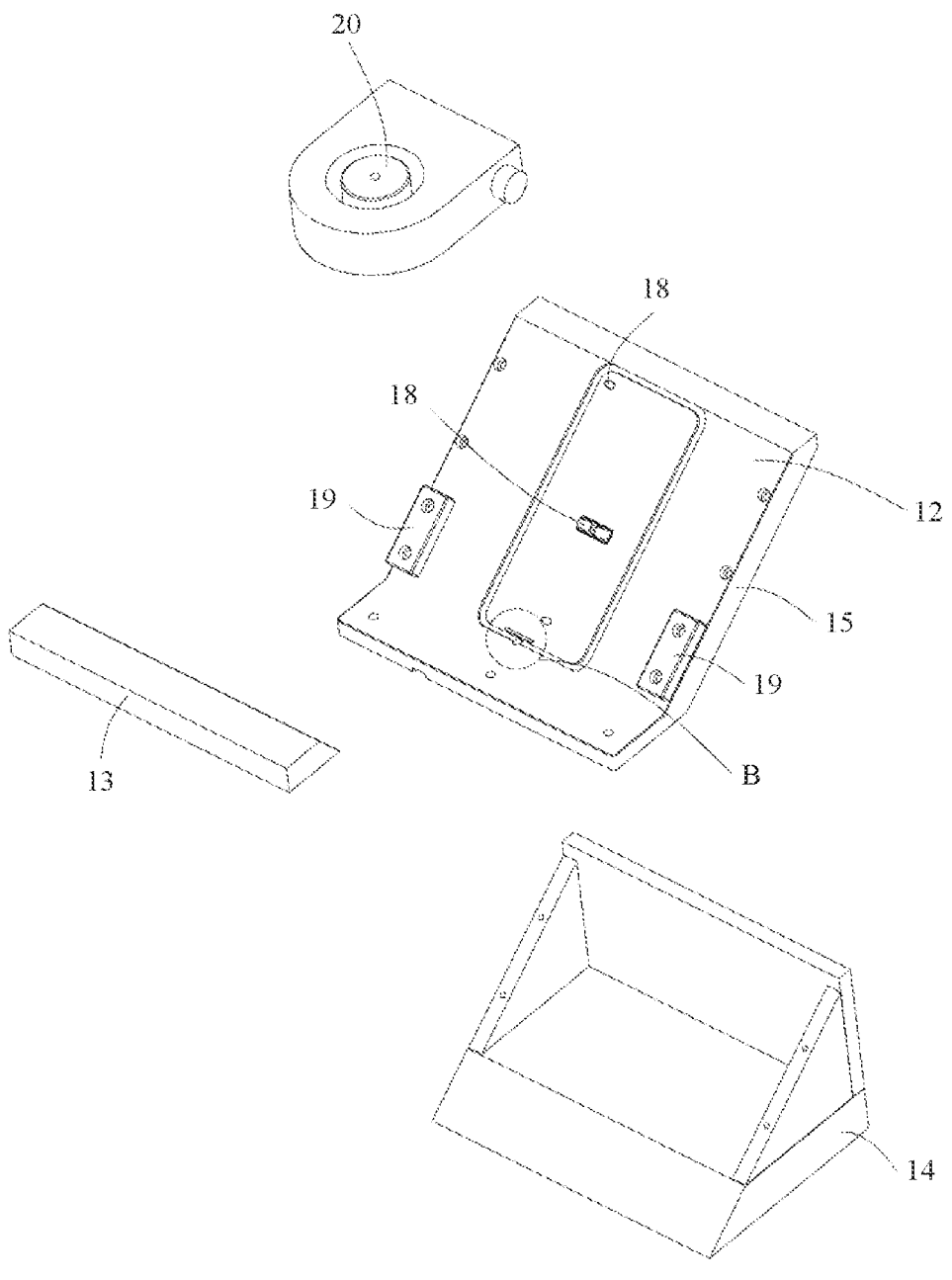
FIG. 12 is an exploded view of a part of a structure of an apparatus for detecting a mounting state of a light pipe in a terminal shown in FIG. 11.
Figure 13:
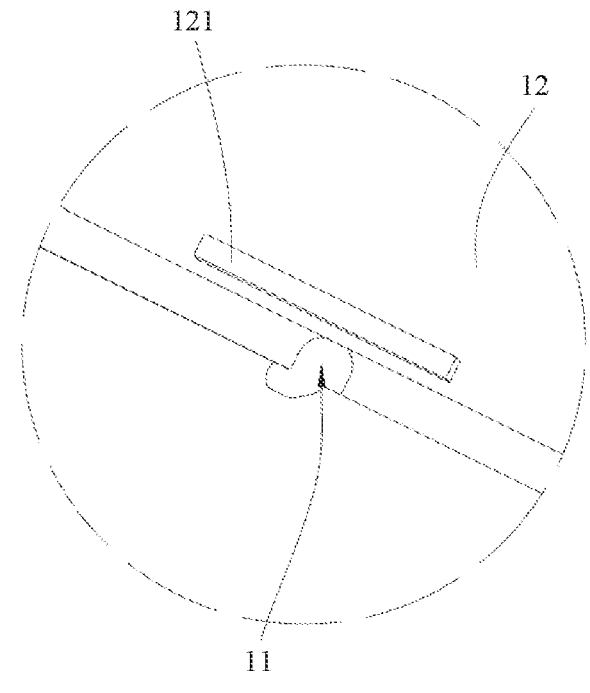
FIG. 13 is a partial enlarged view of B shown in FIG. 12.

In some other embodiments of this application, as shown in FIG. 11 to FIG. 13, the fixture 10 forms an inclined surface 12 that is used to abut against the back of the terminal housing 50. A stopper 13 that is used to limit a position of a bottom of the terminal housing 50 is disposed at a lower edge of the inclined surface 12 of the fixture 10. The light inlet path 11 that is exposed to the opening of the fixture 10 is formed at a bottom edge of the fixture 10 facing the inclined surface 12.

Specifically, a hole such as the sound hole is usually disposed obliquely at an edge of the terminal housing 50, and therefore correspondingly, when the terminal is placed vertically or horizontally, the light pipe is also in an oblique posture in the terminal. During mounting state detection, the light pipe needs to be in a vertical posture perpendicular to a bottom of the fixture 10, to accurately detect the luminous flux value of the detection light that is transmitted and diffused by using the light pipe 51. Therefore, the inclined surface 12 is formed on the fixture 10. In this way, the terminal is disposed on the inclined surface 12, and is in the oblique posture. Correspondingly, the light pipe 51 can be in the vertical posture perpendicular to the bottom of the fixture 10. By disposing the stopper 13 at a lower edge of the inclined surface 12, the stopper 13 can abut against a lower edge of the terminal housing 50 to prevent the terminal housing 50 from slipping down along the inclined surface 12, so that the terminal housing 50 can be stably placed on the fixture 10. In addition, the opening that is of the light inlet path 11 and that is exposed to the fixture 10 is formed at the bottom edge of the inclined surface 12 facing the fixture 10. In this way, the light inlet path 11 may be disposed opposite to the sound hole, so that the detection light emitted from the detection light source 20 is transmitted and diffused by using the light pipe 51, and is directly emitted to the light detection module 30 through the light inlet path 11.

In some other embodiments, as shown in FIG. 11 and FIG. 12, the fixture 10 further includes a base 14 and a support member 15. The support member 15 is detachably disposed on the base 14, and the inclined surface 12 is formed on the support member 15. The stopper 13 is disposed at a lower end of the support member 15, and the light inlet path 11 is formed in the support member 15. An accommodation cavity 111 that is used to accommodate the light detection module 30 is provided at a bottom of the support member 15, and the light inlet path 11 and the accommodation cavity 111 are communicated.

Specifically, in a structure of the fixture 10, the fixture 10 includes the base 14, the support member 15, and the stopper 13. The support member 15 that includes the formed inclined surface 12 is detachably disposed on the base 14, so that the fixture 10 can correspondingly select, based on a terminal with different specifications and structural dimensions, a support member 15 with different inclination angles, and therefore the fixture 10 can be compatible with the terminal with different specifications and structural dimensions, thereby improving compatibility of the fixture 10 for the terminal.

In addition, the accommodation cavity 111 is provided at the bottom of the support member 15, so that the light detection module 30 may be accommodated in the accommodation cavity 111, to implement hidden mounting in the fixture 10. Therefore, on the one hand, the light detection module 30 is protected: on the other hand, an enclosed detection environment is provided for the light detection module 30, so that the light detection module 30 can receive the detection light only from the light inlet path 11, thereby preventing the light detection module 30 from being interfered with by the external ambient light.

Figure 14:
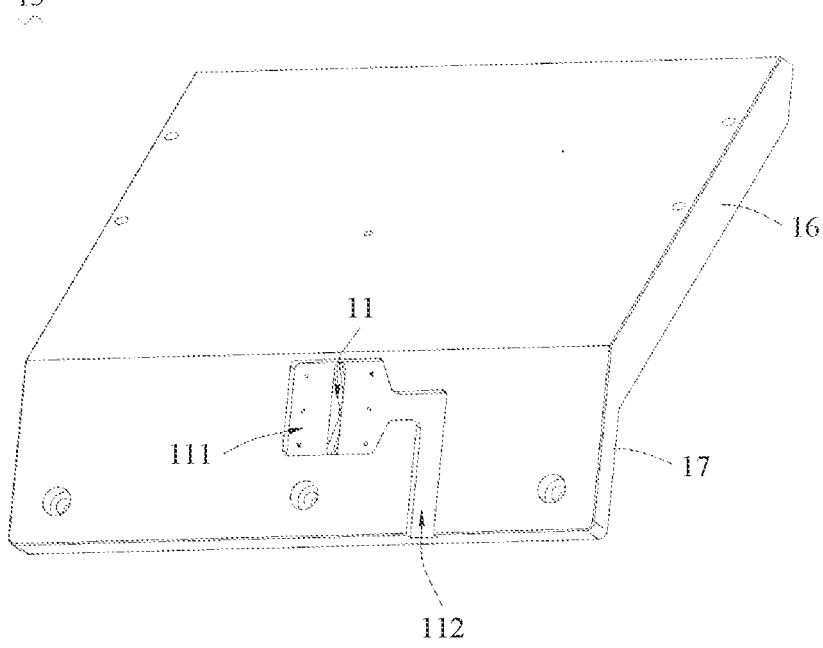
FIG. 14 is a schematic diagram of a structure of a support member of an apparatus for detecting a mounting state of a light pipe in a terminal according to an embodiment of this application.

Optionally, as shown in FIG. 11 and FIG. 14, a cable trough 112 is further disposed at the bottom of the support member 15. An opening on one side of the cable trough 112 is exposed to a side wall of the support member 15, and an opening on the other side of the cable trough 112 and the accommodation cavity 11I are communicated, so that a cable connected to the light detection module 30 can be hidden in the support member 15.

For example, in the first detachable connection manner of the support member 15 and the base 14, the support member 15 may be connected to the base 14 by using a bolt, so that the support member 15 and the base 14 may be detachably connected, and connection strength between the support member 15 and the base 14 is also improved. In addition, in the second detachable connection manner of the support member 15 and the base 14, the support member 15 may be embedded in the base 14, to reduce costs of connecting the support member 15 and the base 14, thereby reducing overall manufacturing costs of the fixture 10.

In some other embodiments of this application, as shown in FIG. 2 and FIG. 3, the support member 15 includes an oblique supporting block 16 and a horizontal supporting block 17. The inclined surface 12 is formed on the oblique supporting block 16, and the oblique supporting block 16 is detachably disposed on the base 14. The horizontal supporting block 17 is disposed at a lower edge of the oblique supporting block 16, the stopper 13 is disposed on the horizontal supporting block 17, and the accommodation cavity 111 is formed at a bottom of the horizontal supporting block 17.

Specifically, the oblique supporting block 16 of the support member 15 is used to support the back of the terminal housing 50, and the horizontal supporting block 17 is used to mount the stopper 13 and accommodate the light detection module 30. The opening that is of the light inlet path 11 and that is exposed to the fixture 10 is formed at a junction of the oblique supporting block 16 and the horizontal supporting block 17, so that the opening that is of the light inlet path 11 and that is exposed to the fixture 10 is opposite to a hole such as the sound hole of the light pipe that is disposed in the terminal housing 50.

Optionally, the oblique supporting block 16 and the horizontal supporting block 17 may be integrally cast, so that manufacturing costs of the support member 15 can be reduced on the one hand and the manufacturing costs of the support member 15 can be saved on the other hand.

In some other embodiments of this application, as shown in FIG. 2 and FIG. 7, the fixture 10 further includes a base 14 and an oblique supporting block 16. The inclined surface 12 is formed on the oblique supporting block 16, and the oblique supporting block 16 is detachably disposed on the base 14. The stopper 13 is disposed on the base 14 and is adjacent to the oblique supporting block 16. The light inlet path 11 is formed in the base 14, and an accommodation cavity 111 that is used to accommodate the light detection module 30 is provided at a bottom of the base 14. The light inlet path 11 and the accommodation cavity 111 are communicated.

Specifically, in another structure of the fixture 10, the fixture 10 includes the base 14, the oblique supporting block 16, and the stopper 13. The oblique supporting block 16 is used to obliquely support the terminal housing 50, and the accommodation cavity 111 that is used to accommodate the light detection module 30 is directly provided at the bottom of the base 14. In this way, when the oblique supporting block 16 is changed, no light detection module needs to be detached from the base 14, thereby improving maintenance convenience of the fixture 10.

In some other embodiments of this application, as shown in FIG. 7, a projection of an opening that is of the light inlet path 11 and that is exposed to the accommodation cavity 111 covers the detection module 31 in a height direction of the fixture 10. Specifically, the opening that is of the light inlet path 11 and that is exposed to the accommodation cavity 111 covers the detection module 31, so that both the first chip 32 and the second chip 33 of the detection module 31 can receive sufficient detection light that is transmitted from the light inlet path 11.

For example, overall configuration of the light inlet pipe 11 may be in a "horn" shape. A narrow end of the horn is the opening that is of the light inlet path 11 and that is exposed to the fixture 10, and a wide end of the horn is the opening that is of the light inlet path 11 and that is exposed to the accommodation cavity 111. In this way, the light inlet path 11 is designed as the "horn" shape, so that on the one hand, a size of the opening that is of the light inlet path 11 and that is exposed to the fixture 10 can match that of a hole such as the sound hole of the terminal; on the other hand, the opening that is of the light inlet path 11 and that is exposed to the accommodation cavity 111 can cover the first chip 32 and the second chip 33 of the detection module 31, so that the first chip 32 and the second chip 33 can sufficiently receive the detection light.

In some other embodiments of this application, as shown in FIG. 2. FIG. 3, and FIG. 11, the fixture 10 further includes a positioning pin 18, and the positioning pin 18 is disposed on the inclined surface 12 and is configured to fasten the terminal housing 50. Specifically, the positioning pin 18 is disposed on the inclined surface 12, so that the positioning pin 18 can be inserted into a groove in the terminal housing 50 to fasten the terminal housing 50 to the inclined surface 12, so as to prevent the terminal housing 50 from sliding relative to the inclined surface 12, so that the terminal housing 50 is more stably disposed on the fixture 10.

For example, one or more positioning pins 18 may be designed based on a quantity of grooves in the terminal housing 50. The positioning pin 18 may be designed into a column shape, a block shape, or the like based on a shape of the groove in the terminal housing 50.

Optionally, as shown in FIG. 11, a limiting bar 121 may be further disposed at a position that is on the inclined surface 12 and that is close to light inlet path 11, and the limiting bar 121 can abut against a bottom edge of the terminal housing 50, so that the terminal housing 50 can be more stably disposed on the fixture 10.

In some other embodiments of this application, as shown in FIG. 2, FIG. 3, and FIG. 11, the fixture 10 further includes two clamping blocks 19, and the two clamping blocks 19 may be detachably disposed on the inclined surface 12. The two clamping blocks 19 are disposed at intervals to clamp the terminal housing 50. Specifically, the two clamping blocks 19 is disposed on the inclined surface 12, so that the two clamping blocks 19 can respectively abut against opposite sides of an edge of the terminal housing 50 that is disposed on the inclined surface 12, to limit a position in a width direction or a length direction of the terminal housing 50, and therefore the terminal housing 50 can be more stably disposed on the fixture 10.

In some other embodiments of this application, as shown in FIG. 1 and FIG. 2, the apparatus for detecting a mounting state of a light pipe 51 in a terminal further includes a box body 40. The fixture 10 is disposed in the box body 40, and the detection light source 20 is disposed on an inner top of the box body 40. Specifically, by disposing the box body 40, on the one hand, the box body 40 can better protect the fixture 10, the terminal housing 50, and the detection light source 20; on the other hand, the box body 40 can also provide an enclosed space for the fixture 10, the terminal housing 50, and the detection light source 20, so that the detection light source 20 is the only light source in the space, thereby improving accuracy and objectivity of the detection result of the mounting state of the light pipe 51 in the terminal housing 50.

For example, a door panel is disposed on one side of the box body 40: the door panel is provided with a doorknob 41; and the door panel is connected to a door frame of the box body 40 by using a hinge 42.

As shown in FIG. 2 to FIG. 4 and FIG. 15, according to a second aspect, an embodiment of this application provides a method for detecting a mounting state of a light pipe in a terminal. The detection method includes the following steps:

provide a fixture 10, where the fixture 10 is configured to support a terminal housing 50, and a light inlet path 11 is formed in the fixture 10, so that the opening that is of the light inlet path 11 and that is exposed to the fixture 10 is opposite to a mounting position of the light pipe 51 in the terminal housing 50; and provide a detection light source 20 and a light detection module 30, dispose the detection light source 20 above the fixture 10, and dispose the light detection module 30 in the fixture 10, where the light detection module 30 receives, through the light inlet path, detection light emitted from the detection light source 11, and determines the mounting state of the light pipe 51 based on a luminous flux value of the detection light.

Specifically, steps of the method for detecting a mounting state of a light pipe in a terminal in this embodiment of this application may be in the following sequence:

S1. Provide a fixture 10, where the fixture 10 is configured to support a terminal housing 50.

S2. Form a light inlet path 11 in the fixture 10, so that the opening of light inlet path 11 that is exposed to the fixture 10 is opposite to the mounting position of the light pipe 51 in the terminal housing 50.

S3. Provide the detection light source 20, and dispose the detection light source 20 above the fixture 10.

S4. Provide a light detection module 30, where the light detection module 30 receives, through the light inlet path 11, detection light emitted from the detection light source 20, and determines the mounting state of the light pipe 51 based on a luminous flux value of the detection light.

When the method for detecting a mounting state of a light pipe in a terminal provided in this embodiment of this application is implemented, the detection light source 20 emits the detection light to the mounting position of the light pipe 51 in the terminal housing 50, and the detection light reaches the light detection module 30 through the mounting position of the light pipe 51 and the light inlet path 11, so that the light detection module 30 can obtain the luminous flux value of the detection light. In this case, due to cases in which the light pipe 51 is properly mounted in the terminal housing 50, the mounting position is deviated, the light pipe 51 is not mounted, or the like, the luminous flux value of the detection light that is transmitted to the light detection module 30 through the light inlet path 11 and the mounting position of the light pipe 51 in the terminal housing 50 varies accordingly. In this way, the light detection module 30 can determine the mounting state of the light pipe 51 in the terminal housing 50 based on the obtained luminous flux value of the detection light, to implement fast, accurate, and contactless detection of the mounting state of the light pipe 51.

In some other embodiments of this application, the step in which "the light detection module 30 receives, through the light inlet path 11, detection light emitted from the detection light source 20, and determines the mounting state of the light pipe 51 based on a luminous flux value of the detection light" may be specifically as follows:

The light detection module 30 obtains a first luminous flux value that is of the detection light emitted into the fixture 10 through the light inlet path 11 that is in a principal axis direction of the light inlet path 11, and compares the first luminous flux value with a preset first threshold and a preset second threshold.

When the first luminous flux value is greater than or equal to the first threshold and is less than or equal to the second threshold, the data processing module outputs a signal indicating that the light pipe 51 is properly mounted; or when the first luminous flux value is less than the first threshold, the light detection module 30 outputs a signal indicating that the mounting position of the light pipe 51 is deviated; or when the first luminous flux value is greater than the second threshold, the light detection module 30 outputs a signal indicating that the light pipe 51 is not mounted.

Specifically, the threshold includes the first threshold and the second threshold. The light detection module 30 is configured to compare the first luminous flux value with the first threshold and the second threshold. In this case, when the first luminous flux value is greater than or equal to the first threshold and is less than or equal to the second threshold, the light detection module 30 may output the signal indicating that the light pipe 51 is properly mounted; or when the first luminous flux value is less than the first threshold, the light detection module 30 outputs the signal indicating that the mounting position of the light pipe 51 is deviated; or when the first luminous flux value is greater than the second threshold, the light detection module 30 outputs the signal indicating that the light pipe 51 is not mounted.

In this way, the light detection module 30 can first obtain the first luminous flux value that is of the detection light emitted into the fixture 10 through the light inlet path 11 and that is in the principal axis direction of the light inlet path 11, and compare the first luminous flux value with the preset first threshold and the preset second threshold. In this case, when the first luminous flux value is between the first threshold and the second threshold, the light pipe 51 is mounted in a correct position; or when the first luminous flux value is less than the first threshold, the light pipe 51 is mounted in a deviated position; or when the first luminous value is greater than the second threshold, the light pipe 51 is not mounted. In this way, quick determining of the mounting state of the light pipe 51 in the terminal housing 50 is implemented simply and reliably.

In some other embodiments of this application, the step in which "the light detection module 30 receives, through the light inlet path 11, detection light emitted from the detection light source 20, and determines the mounting state of the light pipe 51 based on a luminous flux value of the detection light" may be further specifically as follows:

The light detection module 30 obtains a first luminous flux value that is of the detection light emitted into the fixture 10 through the light inlet path 11 that is in a principal axis direction of the light inlet path 11, and compares the first luminous flux value with a preset first threshold and a preset second threshold; and the light detection module 30 obtains a second luminous flux value of the detection light that is emitted into the fixture 10 through the light inlet path 11 and that deviates from the principal axis direction of the light inlet path 11, and compares a percentage of a ratio of the second luminous flux value to the first luminous flux value with a preset third threshold and a preset fourth threshold.

When the first luminous flux value is greater than or equal to the first threshold and is less than or equal to the second threshold, and the percentage of the ratio of the second luminous flux value to the first luminous flux value is less than or equal to the fourth threshold, the light detection module 30 outputs a signal indicating that the light pipe 51 is properly mounted; or when the first luminous flux value is less than the first threshold, the light detection module 30 outputs a signal indicating that the mounting position of the light pipe 51 is deviated; or when the percentage of the ratio of the second luminous flux value to the first luminous flux value is greater than the third threshold or less than the fourth threshold, the light detection module 30 outputs a signal indicating that the mounting position of the light pipe 51 is deviated; or when the first luminous flux value is greater than the second threshold, and the percentage of the ratio of the second luminous flux value to the first luminous flux value is less than the fourth threshold, the light detection module 30 outputs a signal indicating that the light pipe 51 is not mounted.

Specifically, when the first luminous flux value is greater than or equal to the first threshold and is less than or equal to the second threshold, and the percentage of the ratio of the second luminous flux value to the first luminous flux value is less than or equal to the third threshold and is greater than or equal to the fourth threshold, the light detection module

30 outputs the signal indicating that the light pipe 51 is properly mounted. That is, it can be determined that the light pipe 51 is properly mounted only when the first luminous flux value is within the value interval between the first threshold and the second threshold and the percentage of the ratio of the second luminous flux value to the first luminous flux value is within the value interval between the third threshold and the fourth threshold. In this way, accuracy of determining a state in which the light pipe 51 is properly mounted in the terminal housing 50 can be better improved.

In addition, provided that a condition in which the first luminous flux value is less than the first threshold, the percentage of the ratio of the second luminous flux value to the first luminous flux value is greater than the third threshold, or the percentage of the ratio of the second luminous flux value to the first luminous flux value is less than the fourth threshold is met, in this case, it indicates that the mounting position of the light pipe 51 is deviated, resulting in an abnormal first luminous flux value or percentage of the ratio of the second luminous flux value to the first luminous flux value. In this case, the light detection module 30 may output a signal indicating that the mounting position of the light pipe 51 is deviated. In this way, accuracy of determining that the mounting position of the light pipe 51 is deviated in the terminal housing 50 can be better improved.

Alternatively, when the first luminous flux value is greater than the second threshold, and the percentage of the ratio of the second luminous flux value to the first luminous flux value is less than the fourth threshold, in this case, it indicates that the light pipe 51 is not placed at a position in which the light pipe 51 should have been mounted in the terminal housing, and consequently the detection light is not diffused when the detection light passes through the light inlet path 11, so that the first luminous flux value is greater than the second threshold, and the percentage of the ratio of the second luminous flux value to the first luminous flux value is less than the fourth threshold. In this case, the light detection module 30 may output a signal indicating that the light pipe is not mounted. In this way, accuracy of determining that the light pipe 51 is not mounted in the terminal housing 50 can be better improved.

In some other embodiments of this application, the step in which "the light detection module 30 receives, through the light inlet path 11, detection light emitted from the detection light source 20, and determines the mounting state of the light pipe 51 based on a luminous flux value of the detection light" may be further specifically as follows:

The light detection module 30 obtains a first luminous flux value that is of the detection light emitted into the fixture 10 through the light inlet path 11 and that is in a principal axis direction of the light inlet path 11, and obtains a second luminous flux value of the detection light that is emitted into the fixture 10 through the light inlet path 11 and that deviates from the principal axis direction of the light inlet path 11; and the light detection module 30 compares a percentage of a ratio of the second luminous flux value to the first luminous flux value with a preset third threshold and a preset fourth threshold. When the percentage of the ratio of the second luminous flux value to the first luminous flux value is less than or equal to the preset third threshold and is greater than or equal to the preset fourth threshold, the light detection module 30 outputs a signal indicating that the light pipe 51 is properly mounted; or when the percentage of the ratio of the second luminous flux value to the first luminous flux value is greater than the third threshold or less than the fourth threshold, the light detection module 30 outputs a signal indicating that the mounting position of the light pipe 51 is deviated; or when the percentage of the ratio of the second luminous flux value to the first luminous flux value is less than the fourth threshold, the light detection module 30 outputs a signal indicating that the light pipe 51 is not mounted.

Specifically, in this embodiment, provided that a relationship between the percentage of the ratio of the second luminous flux value to the first luminous flux value and the third threshold/the fourth threshold is determined, a result of the mounting state of the light pipe 51 is obtained, and therefore efficiency of detecting the mounting state of the light pipe 51 is improved.

In conclusion, in the apparatus and method for detecting a mounting state of a light pipe in a terminal provided in the embodiments of this application, the light detection module 30 obtains the luminous flux value of the detection light emitted to the light detection module 30 from the mounting position of the light pipe 51 in the terminal housing 50, to determine the mounting state of the light pipe 51 in the terminal housing 50 based on differentiated characteristics of the luminous flux value of the detection light through the mounting position of the light pipe 51 in cases in which the light pipe 51 is properly mounted in the terminal housing 50, the mounting position of the light pipe 51 is deviated, and the light pipe 51 is not mounted, so as to implement fast, accurate, and contactless detection of the mounting state of the light pipe 51.

The above are merely exemplary embodiments of this application, and are not intended to limit this application. Any modification, equivalent replacement, improvement, and the like made within the spirit and principle of this application shall fall within the protection scope of this application.

The invention claimed is:

1. An apparatus for detecting a mounting state of a light pipe in a terminal, comprising:

a fixture, wherein the fixture is configured to support a terminal housing, a light inlet path is formed in the fixture, an opening of the light inlet path exposed to the fixture is opposite to a mounting position of the light pipe in the terminal housing, and the light inlet path is configured to allow light transmitted by the light pipe to pass through;

a detection light source, wherein the detection light source is disposed above the fixture, and is configured to emit detection light to the light pipe; and a light detection module, wherein the light detection module is disposed in the fixture, wherein the light detection module comprises a detection module including at least a first chip that is located opposite to the opening of the light inlet path and exposed to the fixture, a data processor, and an output module, and wherein the light detection module is configured to:

receive, through the light inlet path, the detection light emitted from the detection light source;

obtain, by the first chip, a first luminous flux value of the detection light emitted into the fixture through the light inlet path in a principal axis direction of the light inlet path;

compare the first luminous flux value with a first threshold and a second threshold to determine a comparison result; and output a signal indicating a mounting state of the light pipe based on the comparison result, wherein the mounting state of the light pipe is one of: the light pipe is properly mounted, the mounting position of the light pipe is deviated, or the light pipe is not mounted, wherein when the first luminous flux value is greater than or equal to the first threshold and is less than or equal to the second threshold, the mounting state of the light pipe is that the light pipe is properly mounted;

wherein when the first luminous flux value is less than the first threshold, the mounting state of the light pipe is that the mounting position of the light pipe is deviated; and wherein when the first luminous flux value is greater than the second threshold, the mounting state of the light pipe is that the light pipe is not mounted.

2. The apparatus according to claim 1, wherein the light detection module is further configured to display the signal indicating the mounting state of the light pipe.

3. The apparatus according to claim 1, wherein obtain the first luminous flux value is performed by a first chip comprised in the light detection module, wherein the first chip is located opposite to the opening of the light inlet path and exposed to the fixture.

4. The apparatus according to claim 3, wherein the light detection module further comprises a second chip, and the second chip is configured to obtain a second luminous flux value of the detection light that is emitted into the fixture through the light inlet path and that deviates from the principal axis direction of the light inlet path;

and wherein the light detection module is further configured to compare a percentage of a ratio of the second luminous flux value to the first luminous flux value with a third threshold and a fourth threshold; and when the first luminous flux value is greater than or equal to the first threshold and is less than or equal to the second threshold, and the percentage of the ratio of the second luminous flux value to the first luminous flux value is less than or equal to the third threshold and is greater than or equal to the fourth threshold, the mounting state of the light pipe is that the light pipe is properly mounted; or when the first luminous flux value is less than the first threshold, the mounting state of the light pipe is that the mounting position of the light pipe is deviated; or when the percentage of the ratio of the second luminous flux value to the first luminous flux value is greater than the third threshold or less than the fourth threshold, the mounting state of the light pipe is that the mounting position of the light pipe is deviated; or when the first luminous flux value is greater than the second threshold, and the percentage of the ratio of the second luminous flux value to the first luminous flux value is less than the fourth threshold, the mounting state of the light pipe is that the light pipe is not mounted.

5. The apparatus according to claim 1, wherein the light detection module further comprises a second chip, configured to obtain a second luminous flux value of the detection light that is emitted into the fixture through the light inlet path and that deviates from the principal axis direction of the light inlet path;

and wherein the light detection module is configured to compare a percentage of a ratio of the second luminous flux value to the first luminous flux value with a third threshold and a fourth threshold; and when the percentage of the ratio of the second luminous flux value to the first luminous flux value is less than or equal to the third threshold and is greater than or equal to the fourth threshold, the mounting state of the light pipe is that the light pipe is properly mounted; or when the percentage of the ratio of the second luminous flux value to the first luminous flux value is greater than the third threshold or less than the fourth threshold, the mounting state of the light pipe is that the mounting position of the light pipe is deviated; or when the percentage of the ratio of the second luminous flux value to the first luminous flux value is less than the fourth threshold, the mounting state of the light pipe is that the light pipe is not mounted.

6. The apparatus for detecting a mounting state of a light pipe in a terminal according to claim 4, wherein there are two second chips, and the two second chips are respectively disposed on opposite sides of the first chip.

7. The apparatus for detecting a mounting state of a light pipe in a terminal according to claim 1, wherein the fixture forms an inclined surface that is used to abut against the back of the terminal housing, a stopper that is used to limit a position of a bottom of the terminal housing is disposed at a lower edge of the inclined surface of the fixture, and the opening that is of the light inlet path and that is exposed to the fixture is formed at a bottom edge of the inclined surface facing the fixture.

8. The apparatus for detecting a mounting state of a light pipe in a terminal according to claim 7, wherein the fixture further comprises a base and a support member, the support member is detachably disposed on the base, the inclined surface is formed on the support member, the stopper is disposed at a lower end of the support member, the light inlet path is formed in the support member, an accommodation cavity that is used to accommodate the light detection module is provided at a bottom of the support member, and the light inlet path and the accommodation cavity are communicated.

9. The apparatus for detecting a mounting state of a light pipe in a terminal according to claim 8, wherein the support member comprises an oblique supporting block and a horizontal supporting block, the inclined surface is formed on the oblique supporting block, the oblique supporting block is detachably disposed on the base, the horizontal supporting block is disposed at a lower edge of the oblique supporting block, the stopper is disposed on the horizontal supporting block, and the accommodation cavity is formed at a bottom of the horizontal supporting block.

10. The apparatus for detecting a mounting state of a light pipe in a terminal according to claim 7, wherein the fixture further comprises the base and an oblique supporting block, the inclined surface is formed on the oblique supporting block, the oblique supporting block is detachably disposed on the base, the stopper is disposed on the base and is adjacent to the oblique supporting block, the light inlet path is formed in the base, an accommodation cavity that is used to accommodate the light detection module is provided at a bottom of the base, and the light inlet path and the accommodation cavity are communicated.

11. The apparatus for detecting a mounting state of a light pipe in a terminal according to claim 8, wherein a projection of an opening that is of the light inlet path and that is exposed to the accommodation cavity covers the light detection module in a height direction of fixture.

12. The apparatus for detecting a mounting state of a light pipe in a terminal according to claim 8, wherein the fixture further comprises a positioning pin, the positioning pin is disposed on the inclined surface and is configured to fasten the terminal housing.

13. The apparatus for detecting a mounting state of a light pipe in a terminal according to claim 8, wherein the fixture further comprises two clamping blocks, the two clamping blocks are detachably disposed on the inclined surface, and the two clamping blocks are disposed at intervals, and are configured to clamp the terminal housing.

14. The apparatus for detecting a mounting state of a light pipe in a terminal according to claim 1, wherein the apparatus for detecting a mounting state of a light pipe in a terminal further comprises a box body, the fixture is disposed in the box body, and the detection light source is disposed on an inner top of the box body.

15. A method for detecting a mounting state of a light pipe in a terminal, wherein the method comprising:

providing a fixture, wherein the fixture is configured to support a terminal housing;

forming a light inlet path in the fixture, so that an opening of the light inlet path exposed to the fixture is opposite to a mounting position of the light pipe in the terminal housing;

providing a detection light source, and dispose the detection light source above the fixture; and providing a light detection module, and dispose the light detection module in the fixture, wherein the light detection module comprises a detection module including at least a first chip that is located opposite to the opening of the light inlet path and exposed to the fixture, a data processor, and an output module, and wherein the light detection module is configured to:

receive, through the light inlet path, detection light emitted from the detection light source;

obtain, by the first chip, a first luminous flux value of the detection light emitted into the fixture through the light inlet path in a principal axis direction of the light inlet path;

compare the first luminous flux value with a first threshold and a second threshold to determine a comparison result; and output a signal indicating a mounting state of the light pipe based on the comparison result, wherein the mounting state of the light pipe is one of: the light pipe is properly mounted, the mounting position of the light pipe is deviated, or the light pipe is not mounted, wherein when the first luminous flux value is greater than or equal to the first threshold and is less than or equal to the second threshold, the mounting state of the light pipe is that the light pipe is properly mounted;

wherein when the first luminous flux value is less than the first threshold, the mounting state of the light pipe is that the mounting position of the light pipe is deviated; and wherein when the first luminous flux value is greater than the second threshold, the mounting state of the light pipe is that the light pipe is not mounted.

16. The method for detecting a mounting state of a light pipe in a terminal according to claim 15, wherein that the light detection module receives, through the light inlet path, detection light emitted from the detection light source, and determines the mounting state of the light pipe based on luminous flux of the detection light comprises:

obtaining, by the light detection module, a first luminous flux value that is of the detection light emitted into the fixture through the light inlet path and that is in a principal axis direction of the light inlet path, and comparing the first luminous flux with a preset first threshold and a preset second threshold; and when the first luminous flux value is greater than or equal to the first threshold and is less than or equal to the second threshold, outputting, by the light detection module, a signal indicating that the light pipe is properly mounted; or when the first luminous flux value is less than the first threshold, outputting, by the light detection module, a signal indicating that the mounting position of the light pipe is deviated; or when the first luminous flux value is greater than the second threshold, outputting, by the light detection module, a signal indicating that the light pipe is not mounted.

17. The method for detecting a mounting state of a light pipe in a terminal according to claim 15, wherein that the light detection module receives, through the light inlet path, detection light emitted from the detection light source, and determines the mounting state of the light pipe based on a luminous flux value of the detection light comprises:

obtaining, by the light detection module, a first luminous flux value that is of the detection light emitted into the fixture through the light inlet path and that is in a principal axis direction of the light inlet path, and comparing the first luminous flux value with a preset first threshold and a preset second threshold;

obtaining, by the light detection module, a second luminous flux value of the detection light that is emitted into the fixture through the light inlet path and that deviates from the principal axis direction of the light inlet path, and comparing a percentage of a ratio of the second luminous flux value to the first luminous flux value with a preset third threshold and a preset fourth threshold; and when the first luminous flux value is greater than or equal to the first threshold and is less than or equal to the second threshold, and the percentage of the ratio of the second luminous flux value to the first luminous flux value is less than or equal to the fourth threshold, outputting, by the light detection module, a signal indicating that the light pipe is properly mounted; or when the first luminous flux value is less than the first threshold, outputting, by the light detection module, a signal indicating that the mounting position of the light pipe is deviated; or when the percentage of the ratio of the second luminous flux value to the first luminous flux value is greater than the third threshold or less than the fourth threshold, outputting, by the light detection module, a signal indicating that the mounting position of the light pipe is deviated; or when the first luminous flux value is greater than the second threshold, and the percentage of the ratio of the second luminous flux value to the first luminous flux value is less than the fourth threshold, outputting, by the light detection module, a signal indicating that the light pipe is not mounted.

18. The method for detecting a mounting state of a light pipe in a terminal according to claim 15, wherein that the light detection module receives, through the light inlet path, detection light emitted from the detection light source, and determines the mounting state of the light pipe based on a luminous flux value of the detection light comprises:

obtaining, by the light detection module, a first luminous flux value that is of the detection light emitted into the fixture through the light inlet path and that is in a principal axis direction of the light inlet path, and obtaining a second luminous flux value of the detection light that is emitted into the fixture through the light inlet path and that deviates from the principal axis direction of the light inlet path;

comparing, by the light detection module, a percentage of a ratio of the second luminous flux value to the first luminous flux value with a preset third threshold and a preset fourth threshold; and when the percentage of the ratio of the second luminous flux value to the first luminous flux value is less than or equal to the preset third threshold and is greater than or equal to the preset fourth threshold, outputting, by the light detection module, a signal indicating that the light pipe is properly mounted; or when the percentage of the ratio of the second luminous flux value to the first luminous flux value is greater than the third threshold or less than the fourth threshold, outputting, by the light detection module, a signal indicating that the mounting position of the light pipe is deviated; or when the percentage of the ratio of the second luminous flux value to the first luminous flux value is less than the fourth threshold, outputting, by the light detection module, a signal indicating that the light pipe is not mounted.

19. The method according to claim 15, wherein the light detection module is further configured to display the signal indicating the mounting state of the light pipe.

20. The method according to claim 15, wherein obtain the first luminous flux value is performed by a first chip comprised in the light detection module, wherein the first chip is located opposite to the opening of the light inlet path and exposed to the fixture.

* * * * *